(12) United States Patent
Ohtake et al.

(10) Patent No.: US 10,736,721 B2
(45) Date of Patent: Aug. 11, 2020

(54) MEDIUM, APPARATUS, AND METHOD FOR GENERATING MOVEMENT ROTATION INFORMATION

(71) Applicant: FUJITSU LIMITED, Kawasaki-shi, Kanagawa (JP)

(72) Inventors: Ryosuke Ohtake, Atsugi (JP); Katsumi Umekawa, Yokohama (JP); Tatsukiyo Ishimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/875,923

(22) Filed: Jan. 19, 2018

(65) Prior Publication Data
US 2018/0206959 A1 Jul. 26, 2018

(30) Foreign Application Priority Data
Jan. 25, 2017 (JP) .................................. 2017-011287

(51) Int. Cl.
G06K 9/00 (2006.01)
A61C 19/05 (2006.01)
(Continued)

(52) U.S. Cl.
CPC ............ *A61C 19/05* (2013.01); *A61C 9/0046* (2013.01); *A61C 11/00* (2013.01); *G06T 7/0012* (2013.01);
(Continued)

(58) Field of Classification Search
CPC ..... A61C 11/00; A61C 13/0004; A61C 19/05; A61C 9/0046; G06T 2207/30036; G06T 7/0012; G06T 7/248; G06T 7/66
See application file for complete search history.

(56) References Cited

U.S. PATENT DOCUMENTS

| 5,905,658 A * | 5/1999 | Baba ...................... A61C 11/00 433/69 |
| 6,152,731 A * | 11/2000 | Jordan ............... A61C 13/0003 433/69 |

(Continued)

FOREIGN PATENT DOCUMENTS

| EP | 1510185 A2 | 3/2005 | |
| EP | 1 510 185 | * 12/2012 | ............. A61C 11/00 |

(Continued)

OTHER PUBLICATIONS

Extended European Search Report dated Jun. 13, 2018 for corresponding European Patent Application No. 18150723.7, 7 pages.
(Continued)

*Primary Examiner* — Avinash Yentrapati
(74) *Attorney, Agent, or Firm* — Fujitsu Patent Center

(57) ABSTRACT

A method for generating movement rotation information includes: acquiring a jaw image including a plurality of teeth; specifying first position information indicative of positions of three or more points individually corresponding to three or more types of teeth included in the jaw image; acquiring, in accordance with positional relationship information that associates types of teeth with second position information indicating positions of reference points, the second position information corresponding to three or more reference points individually corresponding to the three or more types of teeth; calculating movement rotation information so that a plane including the three or more points is made coincide with a reference plane including the three or more reference points, the movement rotation information including at least either of a movement amount and a rotation amount with respect to the plane including the three or more points; and outputting the movement rotation information.

8 Claims, 18 Drawing Sheets

(51) Int. Cl.
*A61C 9/00* (2006.01)
*G06T 7/00* (2017.01)
*G06T 7/66* (2017.01)
*G06T 7/246* (2017.01)
*A61C 11/00* (2006.01)
*G06T 19/20* (2011.01)
*A61C 13/00* (2006.01)

(52) U.S. Cl.
CPC ............... *G06T 7/248* (2017.01); *G06T 7/66* (2017.01); *G06T 19/20* (2013.01); *A61C 13/0004* (2013.01); *G06T 2207/10008* (2013.01); *G06T 2207/30036* (2013.01); *G06T 2219/2016* (2013.01)

(56) References Cited

U.S. PATENT DOCUMENTS

| | | | | |
|---|---|---|---|---|
| 6,322,359 | B1* | 11/2001 | Jordan | A61C 13/0003 433/73 |
| 2002/0048741 | A1* | 4/2002 | Jordan | A61C 13/0003 433/73 |
| 2002/0094509 | A1* | 7/2002 | Durbin | A61C 9/00 433/213 |
| 2006/0072810 | A1* | 4/2006 | Scharlack | G06K 9/00 382/154 |
| 2013/0066598 | A1* | 3/2013 | Fisker | A61C 11/00 703/1 |
| 2014/0255873 | A1* | 9/2014 | Bullis | A61C 13/01 433/199.1 |
| 2016/0157969 | A1* | 6/2016 | Fisker | A61C 9/0046 703/11 |
| 2017/0340419 | A1* | 11/2017 | Ohtake | G06K 9/00214 |
| 2017/0345147 | A1* | 11/2017 | Ohtake | G06T 7/0012 |

FOREIGN PATENT DOCUMENTS

| | | |
|---|---|---|
| EP | 2907477 A1 | 8/2015 |
| JP | 9-238963 | 9/1997 |
| JP | 2001-517480 | 10/2001 |
| JP | 2002-099556 | 4/2002 |
| JP | 2009-501616 | 1/2009 |
| JP | 2012-045247 | 3/2012 |
| JP | 2013-520251 | 6/2013 |
| JP | 2017-213060 | 12/2017 |
| JP | 2017-213096 | 12/2017 |
| WO | 99/15100 | 4/1999 |

OTHER PUBLICATIONS

KROA—Office Action of Korean Patent Application No. 10-2018-0007772 dated Nov. 29, 2018 with partial English translation.
European Office Action dated Dec. 12, 2019 for corresponding European Patent Application No. 18150723.7, 7 pages.
CNOA—Office Action of Chinese Patent Application No. 201810063808.2 dated Mar. 2, 2020 with full translation.

* cited by examiner

FIG. 15
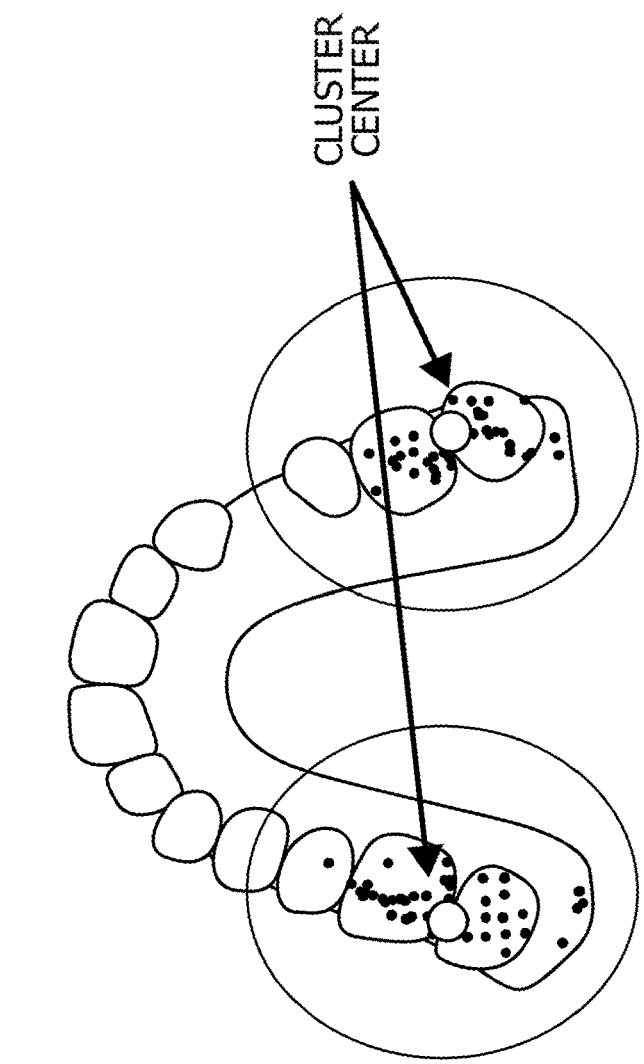
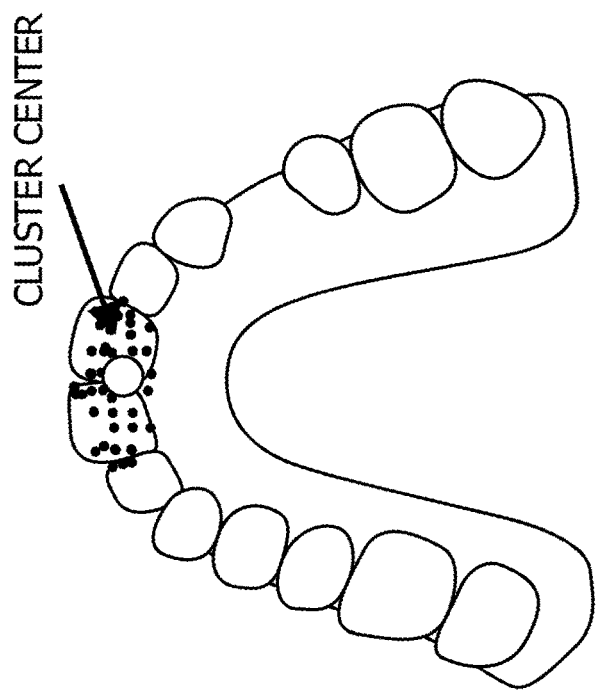

UPPER JAW

LOWER JAW

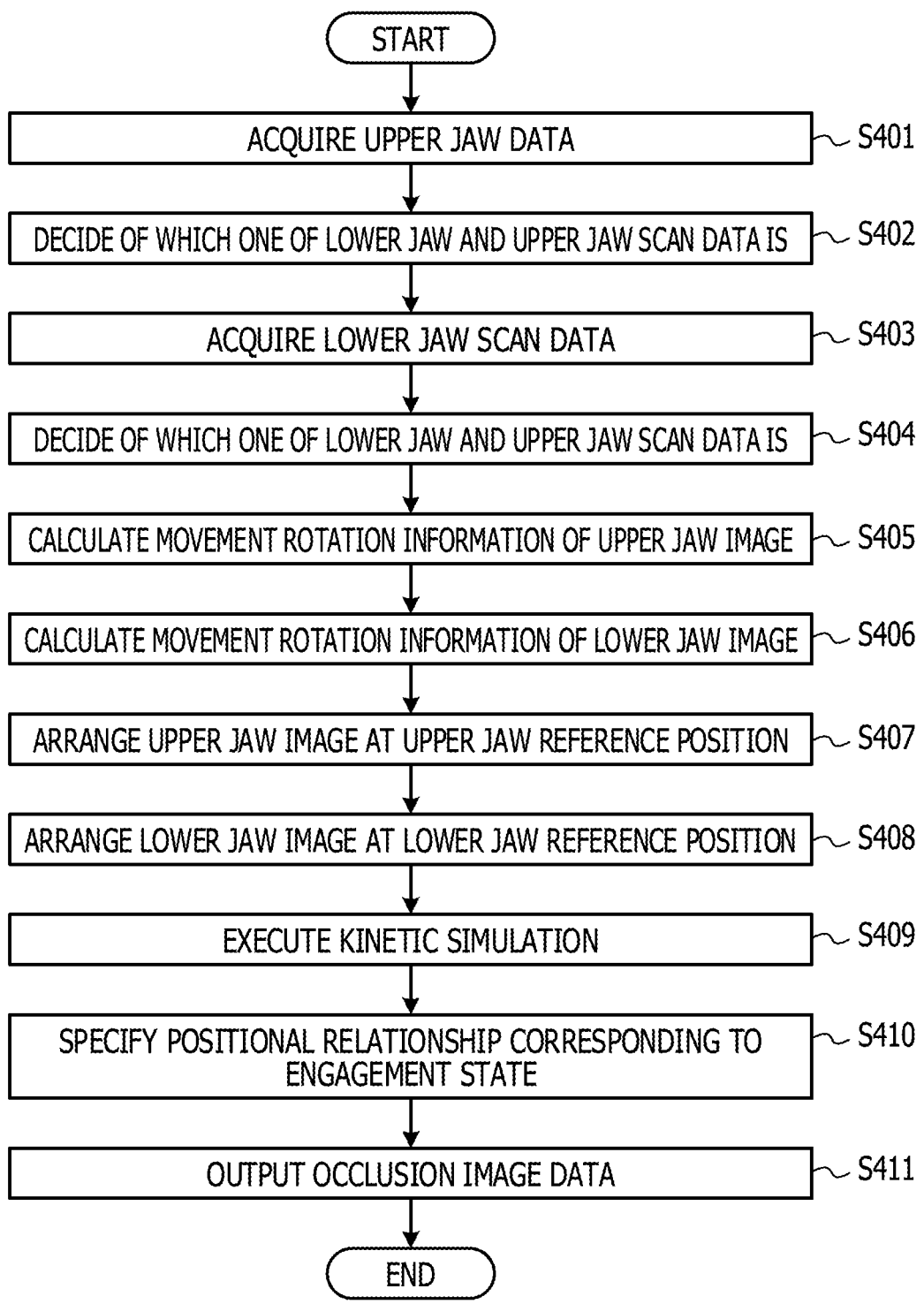

MEDIUM, APPARATUS, AND METHOD FOR GENERATING MOVEMENT ROTATION INFORMATION

CROSS-REFERENCE TO RELATED APPLICATION

This application is based upon and claims the benefit of priority of the prior Japanese Patent Application No. 2017-011287, filed on Jan. 25, 2017, the entire contents of which are incorporated herein by reference.

FIELD

The embodiment discussed herein is related to a medium, an apparatus, and a method for generating movement rotation information.

BACKGROUND

Tooth type data indicative of a tooth form including a shape of a tooth crown of a plurality of teeth is utilized in CAD (Computer-Aided Design) and CAM (Computer-Aided Manufacturing) software for dental use including various functions. For example, arrangement information indicative of a positional relationship at least between a first molar and a second molar of a subject is acquired from a picked up image of the oral cavity of the subject and predict an eruption date of the second molar of a different subject is predicted from the acquired arrangement information. Further, the position and the orientation of an object is detected for recognition and capture a spatial relationship between the upper jaw and the lower jaw of a dental patient using the object for recognition whose position and orientation have been detected.

Further, the coordinates of motion measurement data at a cusp joint position acquired from a masticatory locus of a dentition and the coordinates of shape data acquired from dental plaster models of the upper jaw and the lower jaw in a basic state are made coincide with each other using a transformation matrix. Further, a collision between 3D (three dimensional) models is calculated using a boundary volume hierarchy such as AABB (Axis-Aligned Bounding Box) trees or a spatial distribution structure such as a BSP (Binary Space Partitioning) tree, an octree, or a k-d (k-dimensional) tree to detect an occlusion position at which a virtual upper jaw and a virtual lower jaw contact with each other.

Examples of the related art include Japanese Laid-open Patent Publication No. 2012-45247, Japanese National Publication of International Patent Application No. 2009-501616, Japanese Laid-open Patent Publication No. 09-238963 and Japanese National Publication of International Patent Application No. 2013-520251.

SUMMARY

According to an aspect of the embodiment, a method for generating movement rotation information includes: acquiring a jaw image including a plurality of teeth; specifying first position information indicative of positions of three or more points individually corresponding to three or more types of teeth included in the jaw image; acquiring, in accordance with positional relationship information that associates types of teeth with second position information indicating positions of reference points, the second position information corresponding to three or more reference points individually corresponding to the three or more types of teeth; calculating movement rotation information so that a plane including the three or more points is made coincide with a reference plane including the three or more reference points, the movement rotation information including at least either of a movement amount and a rotation amount with respect to the plane including the three or more points; and outputting the movement rotation information.

The object and advantages of the invention will be realized and attained by mean of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a view illustrating an example in which left and right lower jaw first teeth, lower jaw sixth teeth and lower jaw seventh teeth are used when a movement rotation information generation process is executed;

FIG. 18 is a flow chart of an occlusion state specification process by the occlusion state specification apparatus depicted in FIG. 17.

DESCRIPTION OF EMBODIMENT

A jaw image corresponding to scan data acquired by a dental 3D scanner apparatus includes a direction and an inclination according to the scan state, and the direction and the position of the jaw image are modified to a desired direction and position by a user who utilizes the jaw image. For example, in order to use a virtual articulator that simulates a human jaw movement to create a prosthetic appliance, a user sometimes arranges an upper jaw image and a lower jaw image such that the occlusion plane that passes a location at which the teeth of the upper jaw and the lower jaw mesh with each other coincides with a given reference plane. A work for arranging an upper jaw image and a lower jaw image such that the occlusion plane between them coincides with a given reference plane on a CAD screen image is cumbersome, and there is the possibility that the process for arranging an upper jaw image and a lower jaw image such that the occlusion plane coincides with a given reference plane may put an excessive burden on the user.

Further, an occlusion image of a state in which the teeth of the upper jaw and the lower jaw engage with each other is acquired by superimposing scan data of the upper jaw and the lower jaw obtained by scanning the teeth of the upper jaw and the lower jaw separately on mating scan data acquired by scanning the teeth of the upper jaw and the lower jaw in an engaged state. Various technologies have been proposed by which, in order to omit a process for acquiring mating scan data, an upper jaw image corresponding to upper jaw scan data and a lower jaw image corresponding to lower jaw scan data are combined to create an occlusion image. However, an upper jaw image and a lower jaw image include directions and inclinations according to the scan state, and it is not easy to adjust the positional relationship between an upper jaw and a lower jaw including directions and inclinations according to the scan state such that an occlusion image may be generated.

One embodiment provides a movement rotation information generation computer program that makes it possible to display a jaw image corresponding to scan data acquired by a dental 3D scanner apparatus in a desired direction and at a desired position.

In the following, a movement rotation information generation computer program, a movement rotation information generation apparatus and a method for the same are described with reference to the drawings. It is to be noted that the technical scope of the present technology embraces any equivalence to the technology according to the claims as well as an embodiment of them.

(Outline of Movement Rotation Information Generation Computer Program According to Embodiment)

Figure 1A:
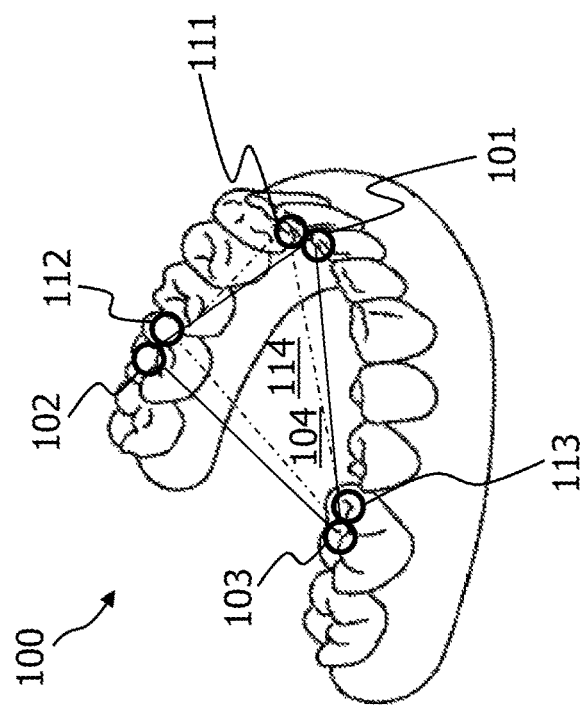
FIG. 1A is a view depicting an example of a lower jaw image corresponding to scan data acquired by a dental 3D scanner apparatus.
Figure 1B:
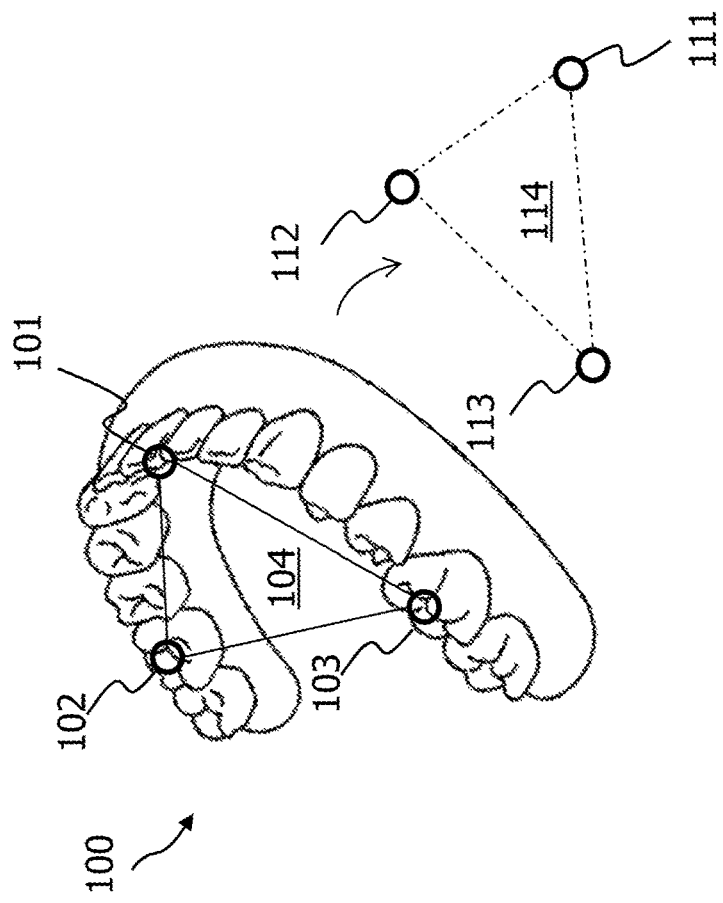
FIG. 1B is a view depicting an example of the lower jaw image moved and rotated to a reference position.

FIG. 1A is a view depicting an example of a lower jaw image corresponding to scan data acquired by a dental 3D scanner apparatus, and FIG. 1B is a view depicting an example of the lower jaw image moved and rotated to a reference position.

In the movement rotation information generation computer program according to the embodiment, a jaw scan data acquisition unit acquires jaw scan data indicative of a lower jaw image 100.

Then, a moving point specification unit specifies coordinates of moving points that are an example of position information of three moving points individually corresponding to at least three types of teeth included in the lower jaw image 100. In one example, the moving point specification unit specifies the coordinates of the center of gravity of the left and right lower jaw first teeth to the coordinates of a first moving point 101, specifies the coordinates of the center of gravity of the left lower jaw sixth tooth to the coordinates of a second moving point 102, and specifies the coordinates of the center of gravity of the right lower jaw sixth tooth to coordinates of a third moving point 103. In another example, the moving point specification section specifies the coordinates of the center between the left and right lower jaw first teeth to the coordinates of the first moving point 101, specifies the coordinates of the center of the left lower jaw sixth tooth to the coordinates of the second moving point 102, and specifies the coordinates of the center of the right lower jaw sixth tooth to the coordinates of the third moving point 103.

Then, a reference point acquisition unit acquires three reference points including a first reference point 111 to a third reference point 113 indicative of reference positions of the at least three types of teeth. In one example, the coordinates of the first reference point 111 are the coordinates of the center of gravity of the left and right lower jaw first teeth of a lower jaw reference image that is made a reference. Meanwhile, the coordinates of the second reference point 112 are the coordinates of the center of gravity of the left lower jaw sixth tooth of the lower jaw reference image that is made a reference, and the coordinates of the second reference point 112 are coordinates of the center of gravity of the right lower jaw sixth tooth of the lower jaw reference image that is made a reference. In another example, the coordinates of the first reference point 111 are the coordinates of the center of the left and right lower jaw first teeth of a lower jaw reference image that is made a reference. Meanwhile, the coordinates of the second reference point 112 are the coordinates of the center of the left lower jaw sixth tooth of the lower jaw reference image that is made a reference, and the coordinates of the third reference point 113 are coordinates of the center of the right lower jaw sixth tooth of the lower jaw reference image that is made a reference. The first reference point 111 to third reference point 113 are stored as positional relationship information, which associates the types of the teeth and the positional relationships with each other, into a storage unit. The first reference point 111 to third reference point 113 are points of an origin having no relation to the lower jaw included in the lower jaw image 100. In one example, the first reference point 111 to third reference point 113 may be acquired from jaw data of a standard model arranged at a standard position, and in another example, the first reference point 111 to third reference point 113 may be prescribed in advance by an apparatus, a system or the like in which the movement rotation information generation computer program is incorporated.

Then, a movement rotation information calculation unit calculates movement rotation information indicative of a movement amount and a rotation amount of a moving plane 104, which is formed from the first moving point 101 to third moving point 103, when the moving plane 104 is to be made coincide with a reference plane 114 formed from the first reference point 111 to third reference point 113. For example, the movement rotation information calculation unit calculates movement rotation information such that the first moving point 101 is made coincide with the first reference point 111, the second moving point 102 is made coincide with the second reference point 112 and the third reference point 113 is made coincide with the third moving point 103. In one example, the movement rotation information is a matrix indicative of a movement amount and a rotation amount of the moving plane 104 when the moving plane 104 is to be made coincide with the reference plane 114.

Then, a movement rotation information outputting unit outputs the calculated movement rotation information.

According to the movement rotation information generation computer program according to the embodiment, by calculating movement rotation information for moving and rotating a jaw image acquired by a dental 3D scanner apparatus in a desired direction and to a desired position, the jaw image may be moved and rotated in a desired direction to a desired position based on the calculated movement rotation information.

(Configuration and Function of Movement Rotation Information Generation Apparatus According to Embodiment)

Figure 2:
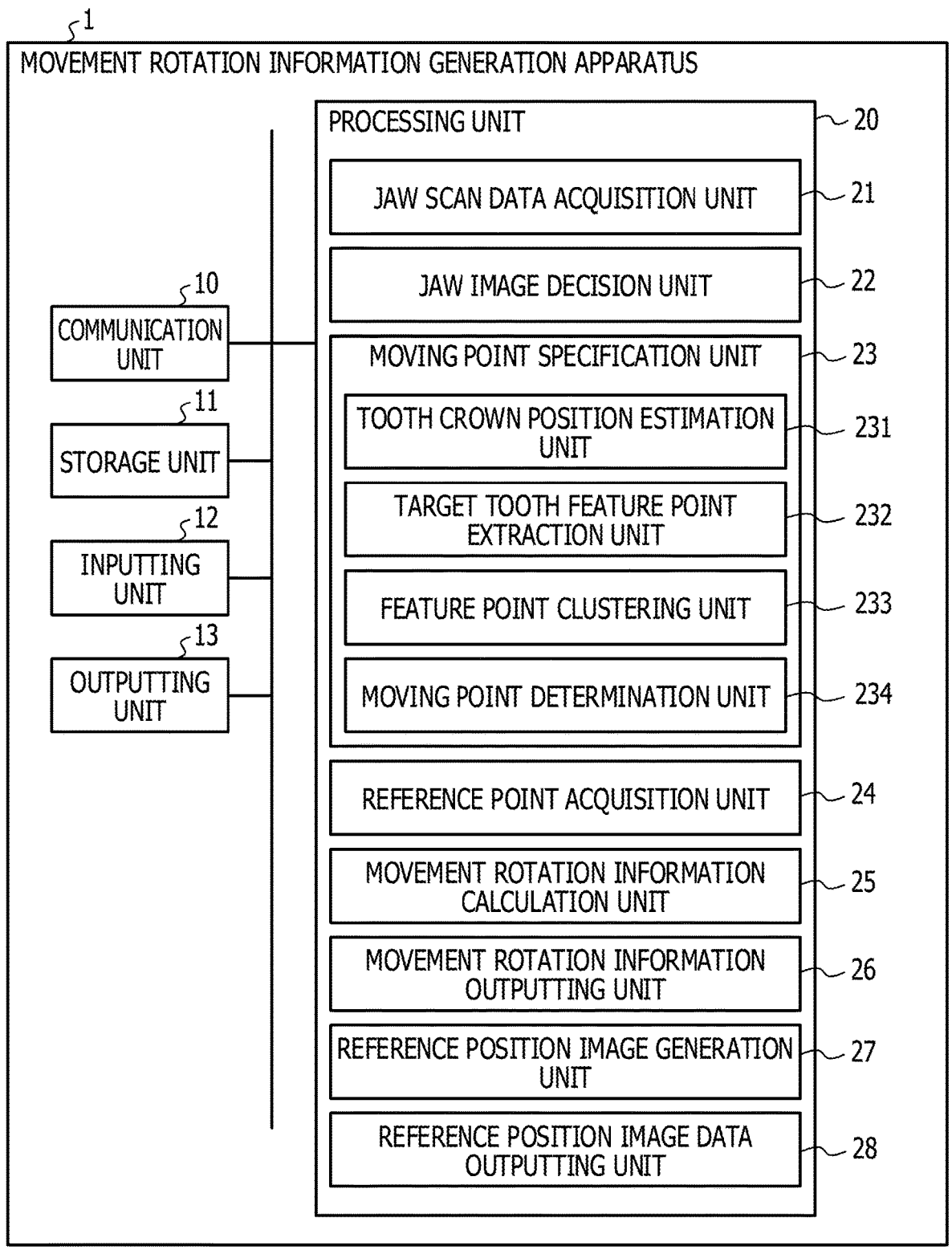
FIG. 2 is a block diagram of a movement rotation information generation apparatus according to an embodiment.

FIG. 2 is a block diagram of a movement rotation information generation apparatus according to the embodiment.

The movement rotation information generation apparatus 1 includes a communication unit 10, a storage unit 11, an inputting unit 12, an outputting unit 13 and a processing unit 20.

The communication unit 10 communicates with a server or the like not depicted through the Internet in accordance with a protocol of HTTP (Hypertext Transfer Protocol). Then, the communication unit 10 supplies data received from the serve or the like to the processing unit 20. Further, the communication unit 10 transmits data supplied from the processing unit 20 to the server or the like.

The storage unit 11 includes at least one of, for example, a semiconductor device, a magnetic tape apparatus, a magnetic disk apparatus and an optical disk apparatus. The storage unit 11 stores an operating system program, a driver program, an application program, data and so forth used in processing by the processing unit 20. For example, the storage unit 11 stores, as an application program, a movement rotation information calculation program for causing the processing unit 20 to execute a movement rotation information calculation process for calculating movement rotation information indicative of a movement amount and a rotation amount of a moving plane indicative of a position of teeth. Further, the storage unit 11 stores, as an application program, a positional relationship specification program for causing the processing unit 20 to execute a positional relationship specification process for specifying a positional relationship corresponding to an occlusion state of the teeth included in an upper jaw image and the teeth included in a lower jaw image. The movement rotation information calculation program and the positional relationship specification program may be installed from a computer-readable portable recording medium such as, for example, a CD-ROM (Compact Disc-Read Only Memory) or a DVD-ROM (Digital Versatile Disc-Read Only Memory) into the storage unit 11 using a known setup program or the like.

Further, the storage unit 11 may store, as data, data to be used in an inputting process and so forth. Furthermore, the storage unit 11 may temporarily store data to be used temporarily in a process such as an inputting process.

The inputting unit 12 may be any device if it is capable of inputting data and is, for example, a touch panel, a key button or the like. An operator may input characters, numerals, symbols and so forth using the inputting unit 12. If the inputting unit 12 is operated by the operator, it generates a signal corresponding to the operation. Then, the generated signal is supplied as an instruction of the operator to the processing unit 20.

The outputting unit 13 may be any device if it may display an image, a frame and so forth and is, for example, a liquid crystal display unit or an organic EL (Electro-Luminescence) display unit. The outputting unit 13 displays an image according to image data supplied from the processing unit 20, a frame according to moving picture data and so forth. Further, the outputting unit 13 is an outputting apparatus that prints an image, a frame, characters or the like on a display medium such as paper.

The processing unit 20 includes one or a plurality of processors and peripheral circuits. The processing unit 20 comprehensively controls entire action of the movement rotation information generation apparatus 1 and is, for example, a CPU (Central Processing Unit). The processing unit 20 executes processing based on programs (a driver program, an operating system program, an application program and so forth) stored in the storage unit 11. Further, the processing unit 20 may execute a plurality of programs (application programs and so forth) in parallel.

The processing unit 20 includes a jaw scan data acquisition unit 21, a jaw image decision unit 22, a moving point specification unit 23, a reference point acquisition unit 24, a movement rotation information calculation unit 25, a movement rotation information outputting unit 26, a reference position image generation unit 27, and a reference position image data outputting unit 28. The moving point specification unit 23 includes a tooth crown position estimation unit 231, a target tooth feature point extraction unit 232, a feature point clustering unit 233 and a moving point determination unit 234. These respective components are functional modules implemented by a program executed by a processor provided in the processing unit 20. Alternatively, the components may be incorporated as firmware in the movement rotation information generation apparatus 1.

(Action of Movement Rotation Information Generation Apparatus According to Embodiment)

Figure 3:
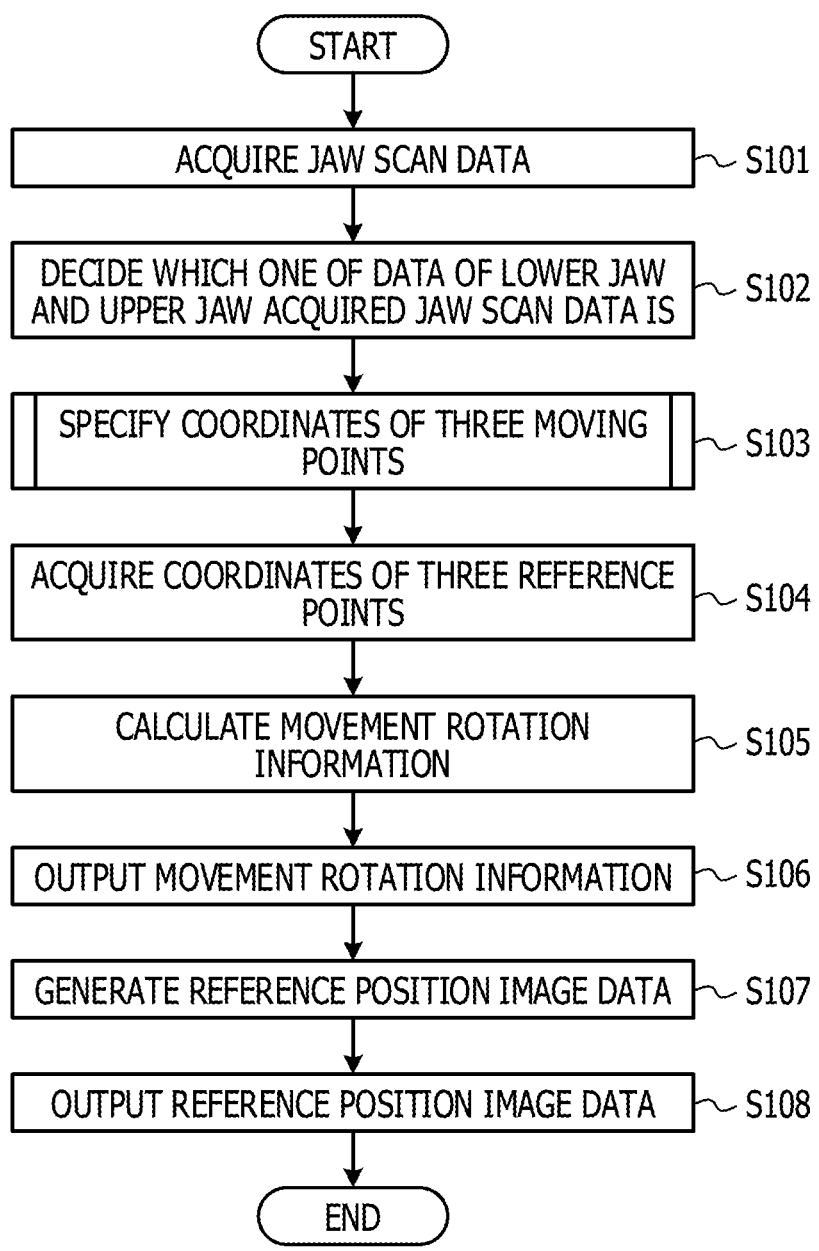
FIG. 3 is a flow chart of a movement rotation information generation process by the movement rotation information generation apparatus depicted in FIG. 2.

FIG. 3 is a flow chart of a movement rotation information generation process by a movement rotation information generation apparatus. The movement rotation information generation apparatus may be the movement rotation information generation apparatus 1 depicted in FIG. 2. The movement rotation information generation process depicted in FIG. 3 is executed in cooperation with the respective components of the movement rotation information generation apparatus 1 principally by the processing unit 20 based on the programs stored in advance in the storage unit 11.

First, the jaw scan data acquisition unit 21 acquires jaw scan data indicative of a shape of tooth crowns each including a plurality of vertices (S101). Then, the jaw image decision unit 22 decides, in response to a selection instruction of the user, whether the acquired jaw scan data is lower jaw scan data corresponding to a lower jaw image including the lower jaw or upper jaw scan data corresponding to an upper jaw image including the upper jaw (S102). The jaw image decision unit 22 decides, in response to a selection instruction inputted through a graphical user interface (GUI) displayed on the outputting unit 13, whether the acquired jaw scan data is lower jaw scan data or upper jaw scan data.

Then, the moving point specification unit 23 specifies the coordinates (that may be referred to as first position information) of three moving points individually corresponding to at least three types of teeth included in the jaw image corresponding to the acquired jaw scan data (S103). The coordinates of a moving point specified by the moving point specification unit 23 are an example of position information of the moving point.

Figure 4:
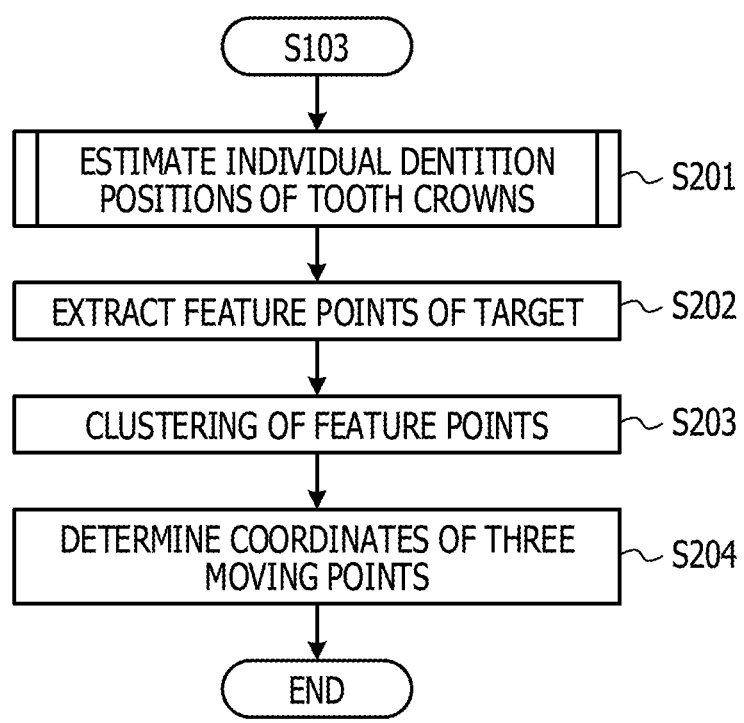
FIG. 4 is a flow chart depicting a more detailed process of a process at S103.

FIG. 4 is a flow chart depicting a more detailed process of the process at S103.

First, the tooth crown position estimation unit 231 estimates a dentition position of each of the tooth crowns included in the jaw scan data (S201).

Figure 5:
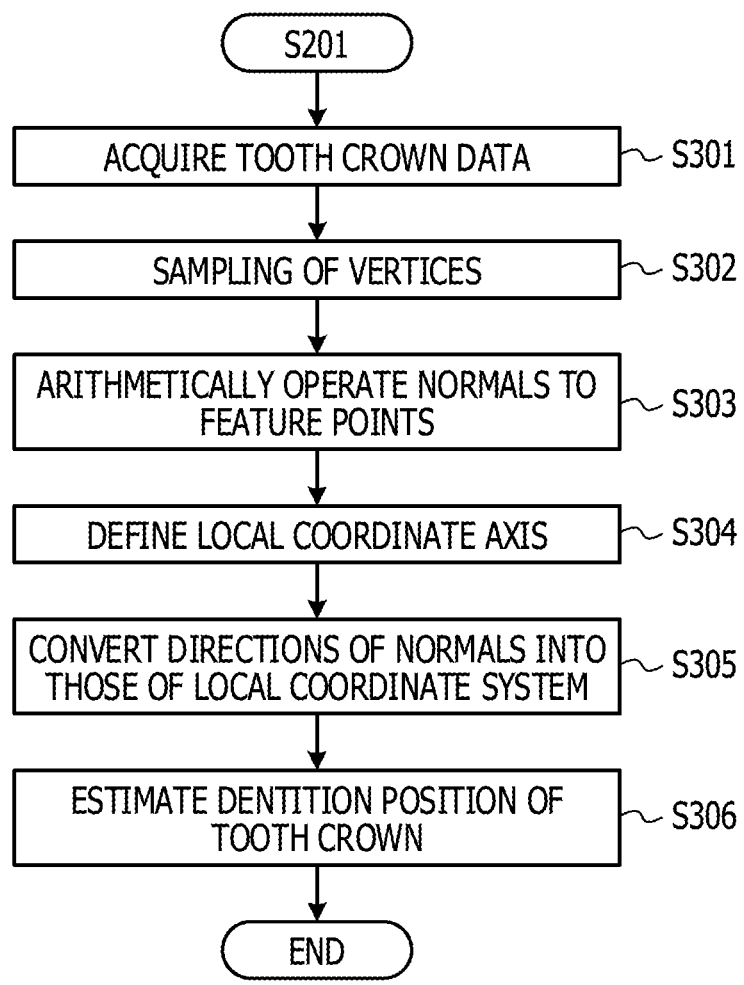
FIG. 5 is a flow chart depicting a more detailed process of a process at S201.
Figure 6:
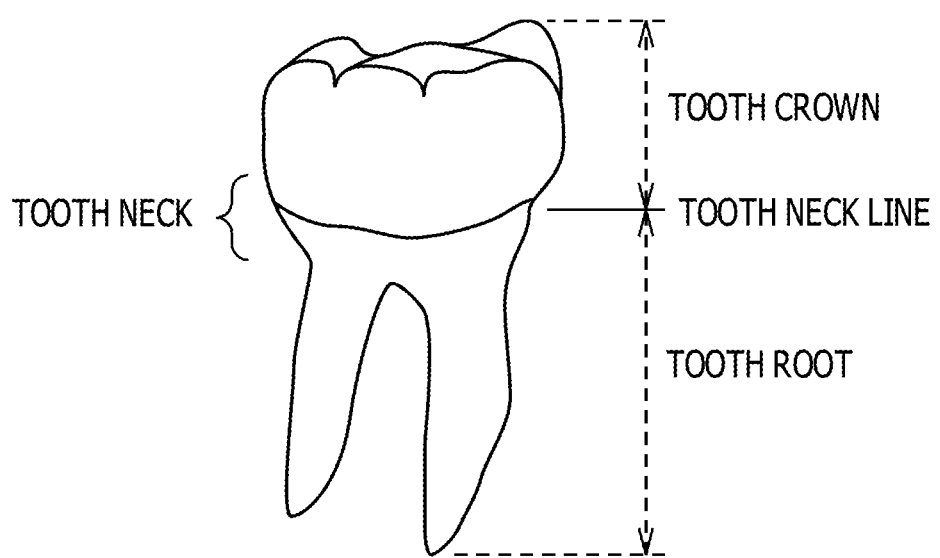
FIG. 6 is a perspective view of a tooth.
Figure 7B:
FIG. 7B is a view depicting a 3D point group corresponding to the 3D surface mesh depicted in FIG. 7A.
Figure 7A:
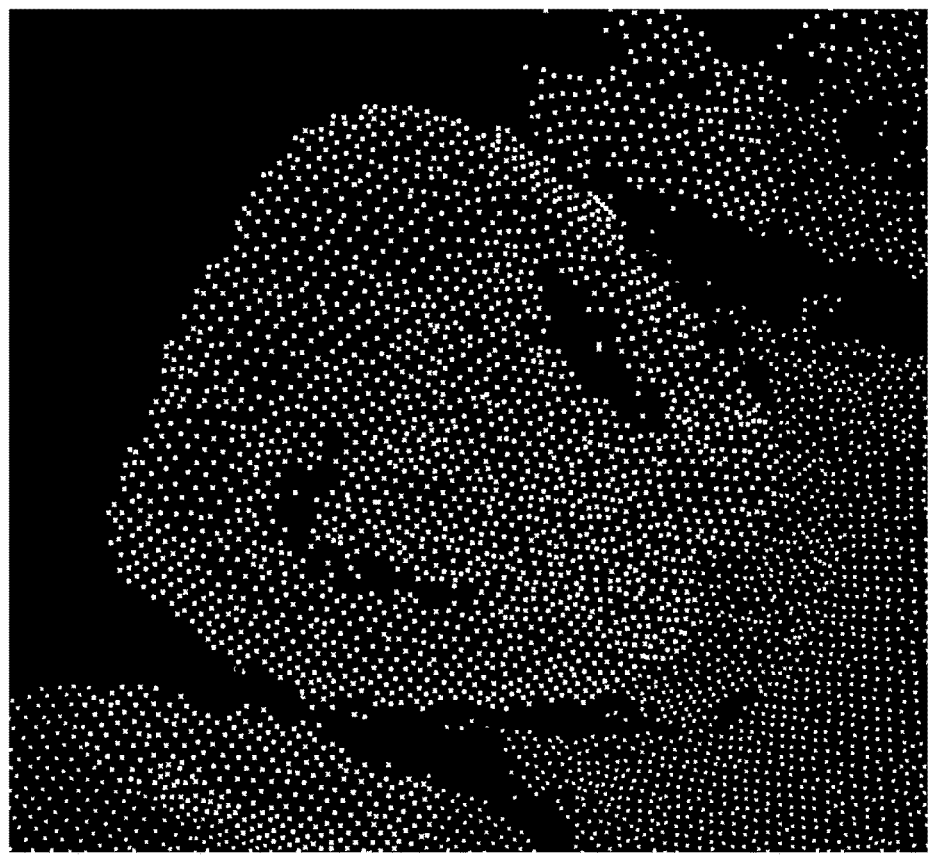
FIG. 7A is a view depicting an example of a 3D surface mesh included in jaw scan data.

FIG. 5 is a flow chart depicting a more detailed process of a process at S201. FIG. 6 is a perspective view of a tooth, and FIG. 7A is a view depicting an example of a 3D surface mesh included in the jaw scan data and FIG. 7B is a view depicting a 3D point group corresponding to the 3D surface mesh depicted in FIG. 7A.

First, the tooth crown position estimation unit 231 acquires tooth crown data indicative of a shape of tooth crowns each including a plurality of vertices (S301).

A tooth crown is a portion that appears outwardly from a tooth ridge and is exposed (erupted) in the oral cavity from within the entire tooth and covered with enamel. A portion of the tooth lower than the tooth crown is called "tooth root," and a boundary line between the tooth crown and the tooth root is called "tooth neck line."

Jaw scan data 701 are acquired as each piece of tooth type information of an unspecified number of people by a dental 3D scanner not depicted. In one example, the jaw scan data 701 are acquired as data for CAD and CAM software for dental use in a dental laboratory, a dental clinic or the like. The jaw scan data 701 are stored in a file format such as stl, ply, off, or 3ds in the storage unit 11. The jaw scan data 701 is an aggregation of triangular polygons. 3D point group data 702 include a plurality of vertices corresponding to the vertices of the triangular polygons included in the jaw scan data 701.

Then, the tooth crown position estimation unit 231 samples the vertices included in an analysis target region of the jaw scan data evenly, for example, uniformly, from the overall area of the aggregation (S302). In one example, the tooth crown position estimation unit 231 samples approximately 200,000 to 600,000 vertices included in the analysis target region of the jaw scan data to sample out approximately 10,000 feature points. Here, the analysis target region is set to a region within a given range from a location of a target at which a type of a tooth is to be specified.

Figure 8:
FIG. 8 is a view depicting an example of feature points sampled by a tooth crown position estimation unit depicted in FIG. 2.

FIG. 8 is a view depicting an example of feature points sampled out by a tooth crown position estimation unit. The tooth crown position estimation unit may be the tooth crown position estimation unit 231 depicted in 2. In FIG. 8, a feature point is indicated by a dark spot.

Then, the tooth crown position estimation unit 231 arithmetically operates normals to the feature points sampled out by the process at S302 (S303). The tooth crown position estimation unit 231 arithmetically operates a normal to each feature point weighting the direction of the normal to a triangular polygon including the feature point in accordance with the area of the polygon.

Figure 9:
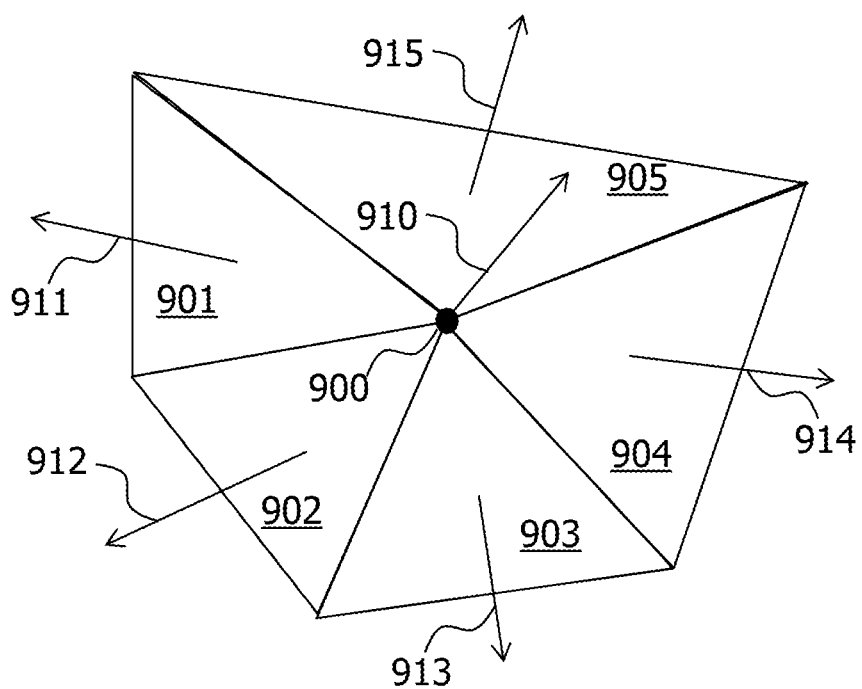
FIG. 9 is a view depicting an example of a process for arithmetically operating a normal to a feature point.

FIG. 9 is a view depicting an example of a process for arithmetically operating a normal to a feature point.

A feature point 900 is a vertex of five polygons of a first polygon 901, a second polygon 902, a third polygon 903, a fourth polygon 904 and a fifth polygon 905. A first normal 911 is a normal to the first polygon 901; a second normal 912 is a normal to the second polygon 902; and a third normal 913 is a normal to the third polygon 903. Further, a fourth normal 914 is a normal to the fourth polygon 904 and a fifth normal 915 is a normal to the fifth polygon 905. The first normal 911, second normal 912, third normal 913, fourth normal 914 and fifth normal 915 have a substantially equal unit length.

The tooth crown position estimation unit 231 arithmetically operates the direction of a normal 910 of the feature point 900 weighting the first normal 911 to fifth normal 915 with the areas of the first polygon 901 to fifth polygon 905, respectively. The normal 910 to the feature point 900 has a unit length similarly to the first normal 911 to fifth normal 915.

Figure 10:
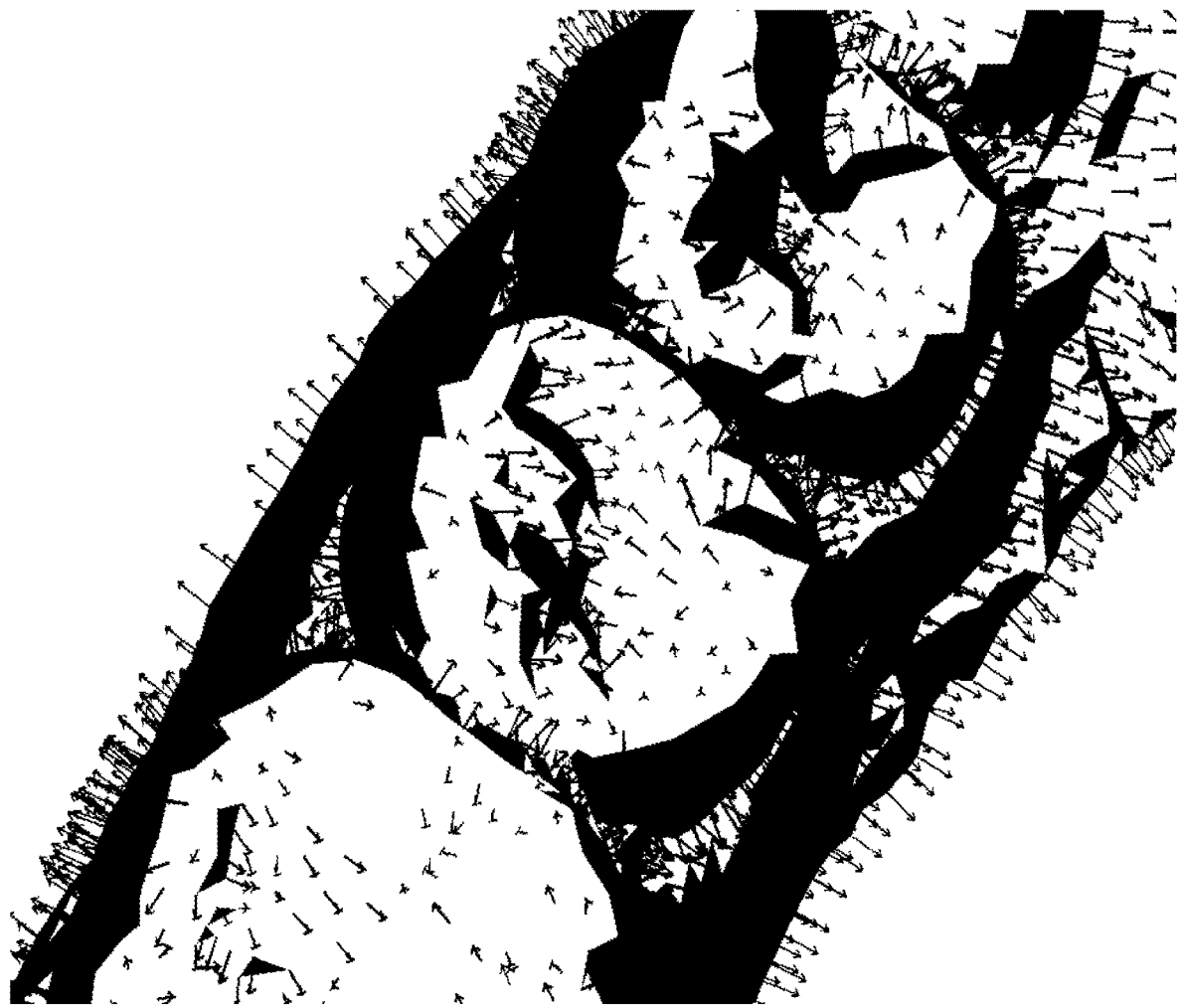
FIG. 10 is a view depicting an example of normals to feature points arithmetically operated by a process at S303.

FIG. 10 is a view depicting an example of normals to feature points arithmetically operated by a process at S303. Each of the normals to the feature points arithmetically operated by the process at S303 is arithmetically operated weighing the directions of normals to triangular polygons including the feature points in accordance with the areas of the polygons, and the normals have a substantially equal unit length.

Then, the tooth crown position estimation unit 231 defines, for each of the plurality of feature points, local coordinate axes based on the distribution of the directions of the normals arithmetically operated by the process at S303 (S304). For example, the tooth crown position estimation unit 231 calculates a local coordinate system based on the variance of the normals to the point group included in the analysis target region.

Figure 11:
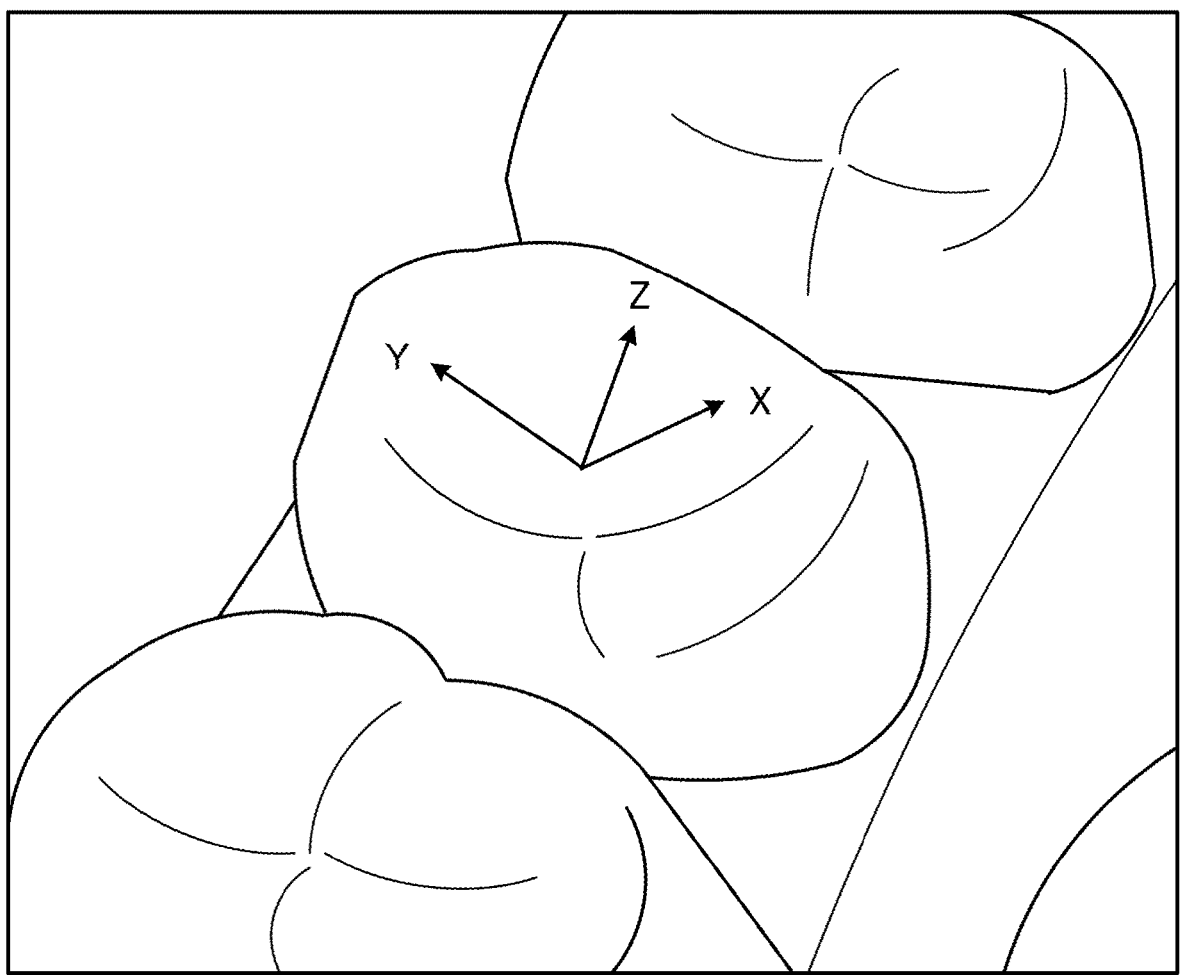
FIG. 11 is a view depicting an example of a local coordinate system arithmetically operated by a process at S304.

FIG. 11 is a view depicting an example of a local coordinate system (Local Reference frame, LRF) arithmetically operated by the process at S304.

In the local coordinate system, the X direction in which the X axis extends is defined as a direction in which the distribution of the directions of the normals arithmetically operated by the process at S303 disperses most, for example, as a direction in which the variance is greatest. Meanwhile, the Y direction in which the Y axis extends is a direction perpendicular to the X direction, and the Z direction in which the Z axis extends is a direction perpendicular to both the X direction and the Y direction. In one example, the Y direction is arithmetically operated from the cross product of the X axis and a second axis calculation axis N extending in a direction in which the variance of the arithmetically operated directions of the normals is in the minimum as described in Japanese Patent Application No. 2016-107358 and Japanese Patent Application No. 2016-107803. For example, the Y axis direction is a direction that is perpendicular to the X axis and perpendicular to the second axis calculation axis N.

Thereafter, the tooth crown position estimation unit 231 converts, for each of the plurality of feature points, the direction of the normal to the feature point arithmetically operated by the process at S303 into that in the local coordinate system arithmetically operated by the process at S304 (S305). For example, the tooth crown position estimation unit 231 determines the distribution of the directions in the local coordinate system of the unit normal vectors corresponding to the individual points of the point group included in the analysis target region.

Figure 12:
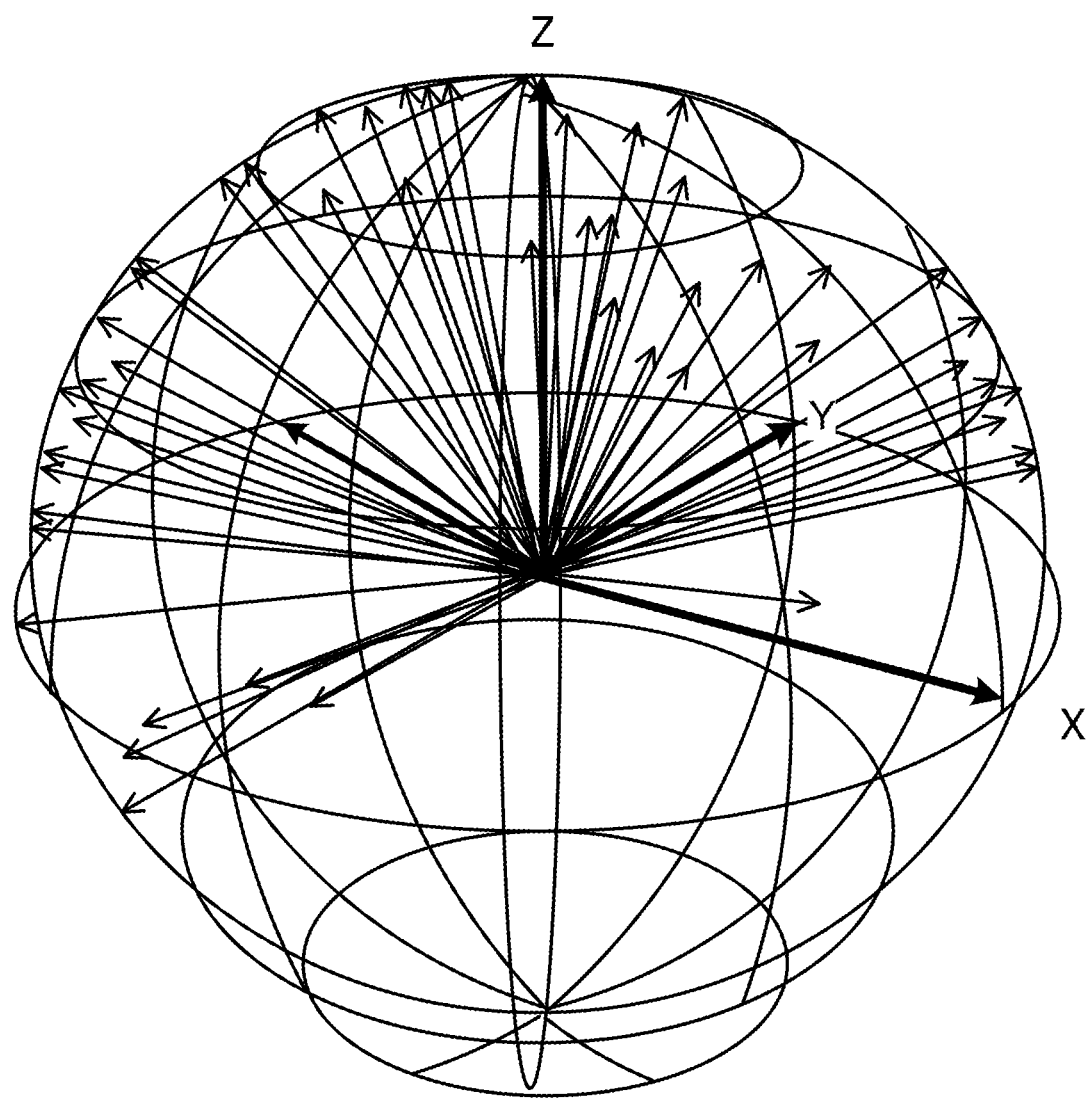
FIG. 12 is a histogram depicting directions of normals to feature points converted to those of a local coordinate system by a process at S305.

FIG. 12 is a histogram depicting directions of normals to feature points converted into those of the local coordinate system by a process at S305. The histogram depicted in FIG. 12 is referred to also as SHOT describer.

The tooth crown position estimation unit 231 may indicate a shape around a periphery of feature point by describing the normals to the feature points arithmetically operated by the process at S303 as a histogram in which the start points of the respective normals are set to the origin and the end portions of the respective normals to the feature points are arranged on a spherical plane.

Then, the tooth crown position estimation unit 231 estimates tooth crown position information indicative of a dentition position of a tooth corresponding to a tooth crown from the distribution of the directions of the normals to the plurality of feature points converted into those of the local coordinate system by the process at S305 (S306). For example, the tooth crown position estimation unit 231 refers to the storage unit, in which the distribution information of the directions in the local coordinate system of the unit normal vectors corresponding to the individual points of the point group is stored in an associated relationship with the types of the teeth to estimate the type of the tooth corresponding to the determined distribution as the type of the tooth in the analysis target region. When it is decided by the process at S102 that the jaw scan data is lower jaw scan data, the tooth crown position estimation unit 231 refers to the distribution information of the teeth included in the lower jaw. On the other hand, if it is decided by the process at S102 that the jaw scan data is upper jaw scan data, the tooth crown position estimation unit 231 refers to the distribution information of the teeth included in the upper jaw. In one example, the dentition position of a tooth is a number indicated by the Federation dentaire internationale (FDI) notation, which indicates the position of a tooth including a tooth crown in a dentition.

The tooth crown position estimation unit 231 estimates tooth crown position information indicative of the position of the tooth crown from the distribution of the directions of the respective normals to a plurality of feature points by mechanical learning. For example, when many numerical vector data are obtained, if the vector data indicate a pattern, the tooth crown position estimation unit 231 learns the pattern and estimates a number indicated by the FDI notation based on the learned pattern.

The function of the tooth crown position estimation unit 231 that detects and specifies feature points belonging to a portion of a tooth crown of a number indicated by the FDI notation from jaw scan data is created, for example, by the following procedures (i) to (iii).

(i) From several thousand jaw scan data, a two-dimensional histogram at the center position of a tooth crown of a number indicated by the FDI notation is acquired.

(ii) The correspondence between the number indicated by the FDI notation and the two-dimensional histogram is learned by the tooth crown position estimation unit 231.

(iii) It is confirmed that the tooth crown position estimation unit 231 having learned by the procedure (ii) has a given detection function.

Figure 13A:
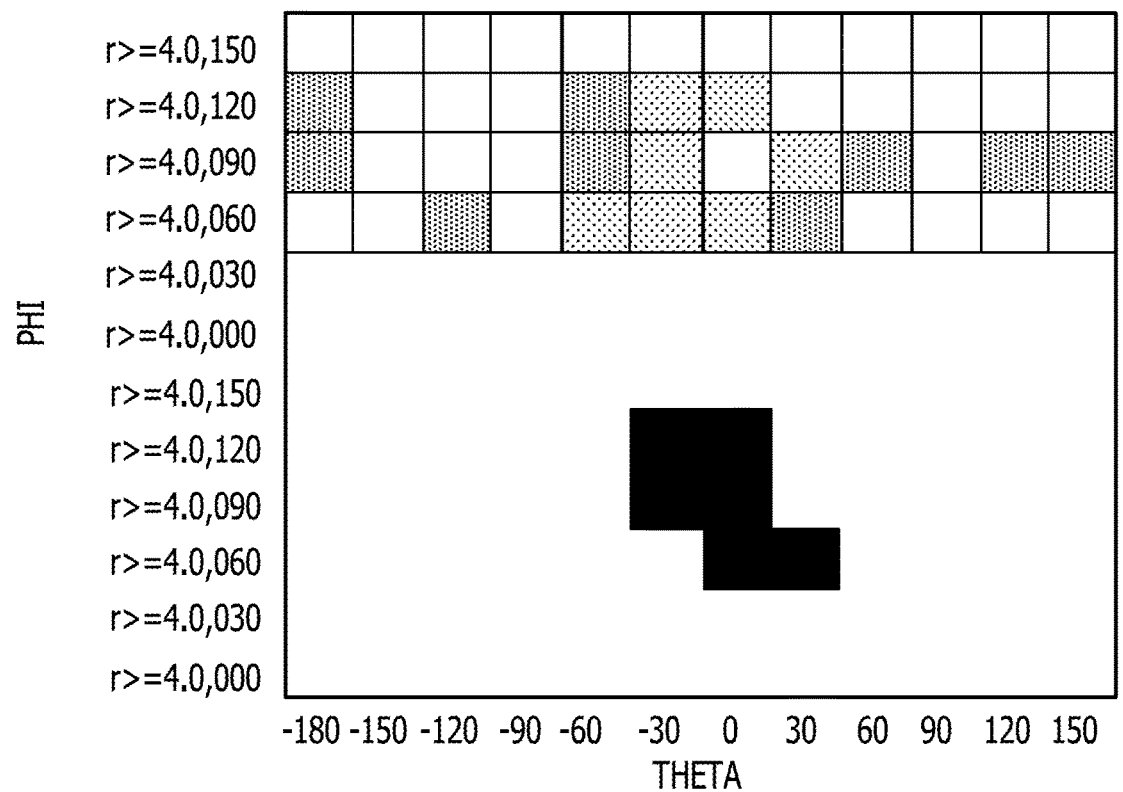
FIG. 13A is a view depicting an example of a two-dimensional histogram.
Figure 13B:
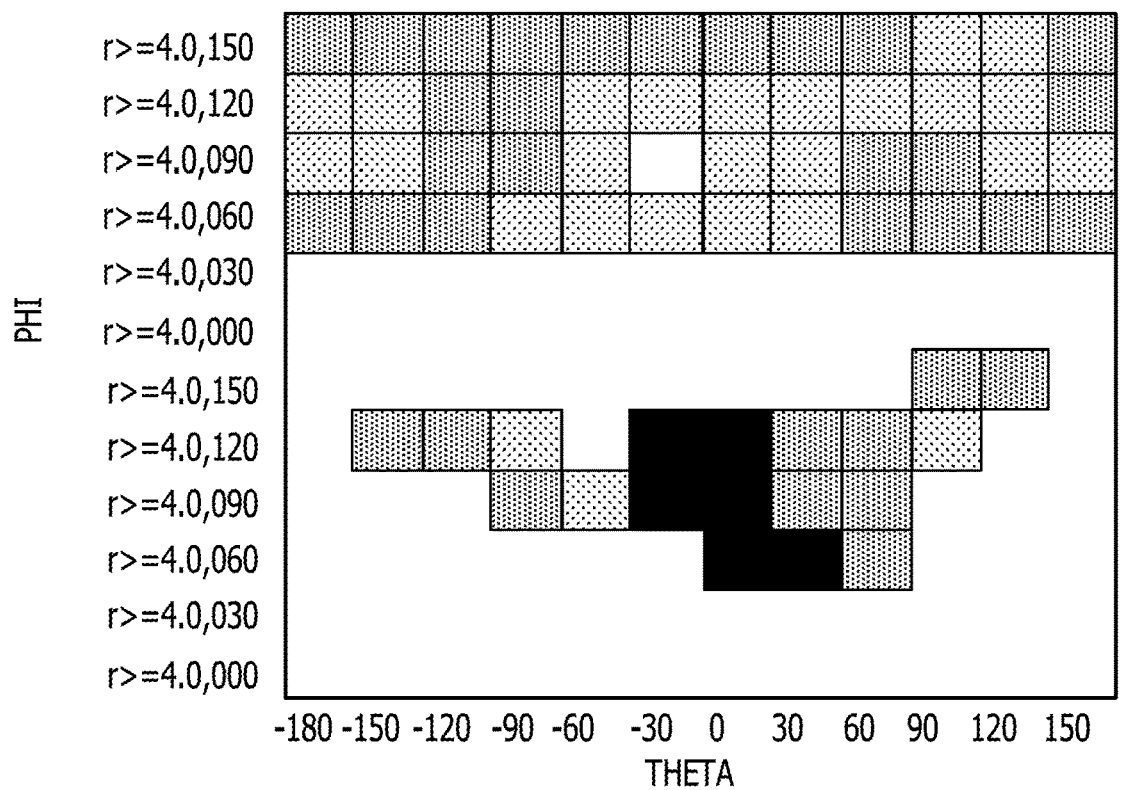
FIG. 13B is a view depicting another example of a two-dimensional histogram.

FIG. 13A is a view depicting an example of a two-dimensional histogram, and FIG. 13B is a view depicting another example of a two-dimensional histogram. In FIGS. 13A and 13B, the axis of abscissa and the axis of ordinate indicate argument angles $\theta$ and $\varphi$ of the local coordinate system at the feature point converted by the process at S305, respectively.

FIG. 13A depicts an example of a two-dimensional histogram corresponding to the number 11 represented by the FDI notation, and FIG. 13B depicts an example of a two-dimensional histogram corresponding to the number 14 represented by the FDI notation.

After processing at S201 comes to an end, the target tooth feature point extraction unit 232 extracts feature points of a target tooth to be made a target from the feature points of the teeth sampled out by the process at S302 (202) in order to use the feature points when three moving points are to be specified. Where the teeth to be used when three moving points are to be specified are the left and right lower jaw first teeth, left lower jaw sixth tooth and right lower jaw sixth tooth, the target tooth feature point extraction unit 232 extracts feature points of the lower jaw first teeth and the lower jaw sixth teeth.

Then, the feature point clustering unit 233 performs clustering of the feature points extracted by the process at S203 for each tooth (S203). In one example, the feature point clustering unit 233 classifies the feature points, which are positioned in a spaced relationship from each other by a distance equal to or greater than a given threshold value, into different clusters. Since left and right teeth to which the same number is applied have shapes substantially symmetrical with respect to a line, it is not easy to decide whether feature points included in a jaw image corresponding to jaw scan data and forming left and right teeth to which the same number is applied are feature points of a left tooth or a right tooth. The feature point clustering unit 233 performs clustering of feature points that form left and right teeth by classifying the feature points into left and right clusters based on a threshold value distance greater than the width of a tooth crown of a tooth and smaller than the distance between left and right teeth to which the same number is applied. For example, the feature point clustering unit 233 clusters feature points that form images of the left lower jaw sixth tooth and the right lower jaw sixth tooth based on a threshold value distance that is greater than the width of the tooth crown of the lower jaw sixth teeth and smaller than the distance between the left and right lower jaw sixth teeth. It is to be noted that, since the left and right lower jaw first teeth are positioned adjacent each other, the left and right lower jaw first teeth may be handled as a single tooth without clustering feature points forming images of the left lower jaw first tooth and the right lower jaw first tooth.

Then, the moving point determination unit 234 determines coordinates of the three moving points of the first moving point to third moving point based on the feature points clustered by the process at S203 (S204). In one example, the moving point determination unit 234 determines the coordinates of the center of gravity of the feature points that form images of the left and right lower jaw first teeth as the coordinates of the first moving point. Further, the moving point determination unit 234 determines the coordinates of the center of gravity of the feature points that form an image of the left lower jaw sixth tooth as the coordinates of the second moving point, and determines the coordinates of the center of gravity of the feature points that form an image of the right lower jaw sixth teeth as the coordinates of the third moving point. In another example, the moving point determination unit 234 determines the coordinates of the center of the feature points that form images of the left and right lower jaw first teeth as the coordinates of the first moving point. Further, the moving point determination unit 234 determines the coordinates of the center of the feature points that form an image of the left lower jaw sixth tooth as the coordinates of the second moving point, and determines the coordinates of the center of the feature points that form an image of the right lower jaw sixth teeth as the coordinates of the third moving point.

After the process at S103 comes to an end, the reference point acquisition unit 24 acquires the coordinates of the three reference points including the first to third reference points indicative of respective reference positions of the at least three types of teeth (such coordinates may be referred to as second position information) (S104). The first to third reference points are points of an origin having no relation to the lower jaw scan data acquired by the process at S101. In one example, the first to third reference points may be acquired from jaw data of a standard model arranged at a standard position, and in another example, the first to third reference points may be defined in advance by an apparatus, a system or the like in which the movement rotation information generation program is incorporated. In one example, the coordinates of the first reference point are the coordinates of the center of gravity of the left and right lower jaw first teeth of a lower jaw reference image that is made a reference. Meanwhile, the coordinates of the second reference point are the coordinates of the center of gravity of the left lower jaw sixth tooth of the lower jaw reference image that is made a reference, and the coordinates of the third reference point are coordinates of the center of gravity of the right lower jaw sixth tooth of the lower jaw reference image that is made a reference. In another example, the coordinates of the first reference point are the coordinates of the center of the left and right lower jaw first teeth of a lower jaw reference image that is made a reference, and the coordinates of the second reference point are the coordinates of the center of the left lower jaw sixth tooth of the lower jaw reference image that is made a reference and the coordinates of the third reference point are coordinates of the center of the right lower jaw sixth tooth of the lower jaw reference image that is made a reference. Each of the coordinates of the first to third reference points (such coordinates may be referred to as second position information) is stored as positional relationship information in an associated relationship with the types of the teeth into the storage unit 11. For example, the positional relationship information includes types of teeth and second position information.

Then, the movement rotation information calculation unit 25 calculates movement rotation information indicative of a movement amount and a rotation amount of a moving plane formed from the first to third moving points when the moving plane is to be made coincide with the reference plane formed from the first to third reference points (S105). For example, the movement rotation information calculation unit 25 calculates movement rotation information such that the first moving point 101 is made coincide with the first reference point 111 and the second moving point 102 is made coincide with the second reference point 112 and besides the third moving point 103 is made coincide with the third reference point 113. In one example, the movement rotation information may be information indicative of parallel movement and rotation by affine transformation or may be a matrix indicative of a movement amount and a rotation amount of the moving plane when the moving plane is to be made coincide with the reference plane.

In one example, the movement rotation information calculation unit 25 first moves the moving plane such that the center of gravity of a triangle formed from the first to third moving points coincides with the center of gravity of a triangle formed from the first to third reference points. Then, the movement rotation information calculation unit 25 rotates the moving plane around the center provided by the center of gravity of the triangle formed from the third to third moving points such that the moving plane and the reference plane coincide with each other. Then, the movement rotation information calculation unit 25 rotates the first to third moving points in a plane on the reference plane such that the sum of separation distances between the first to third moving points and the first to third reference points is minimized. The sum of the separation distances between the first to third moving points and the first to third reference points is, in an example, arithmetically operated by the least-square method of the respective distances between the first to third moving points and the first to third reference points.

Since the magnitude of the lower jaw included in a lower jaw image corresponding to scan data acquired by a dental 3D scanner apparatus varies depending upon the magnitude of the lower jaw of a patient whose lower jaw is scanned, all of the first to third moving points and the first to third reference points do not fully coincide with each other. In order to make the first to third moving points and the first to third reference points coincide with each other as far as possible, the movement rotation information calculation unit 25 moves and rotates the first to third moving points such that the sum of the separation distances between the first to third moving points and the first to third reference points is minimized.

Then, the movement rotation information outputting unit 26 outputs the calculated movement rotation information (S106).

Then, the reference position image generation unit 27 generates reference position image data indicative of the reference position image arranged by movement and/or rotation of the jaw image corresponding to the jaw scan data based on the movement rotation information (S107). The reference position image may be an image obtained by moving the jaw image corresponding to the jaw scan data or an image obtained by rotating the jaw image corresponding to the jaw scan data or else an image obtained by moving and rotating the jaw image corresponding to the jaw scan data.

Then, the reference position image data outputting unit 28 outputs the reference image data generated by the process at S107 (S108).

(Operation/Working Effect of Movement Rotation Information Generation Apparatus According to Embodiment)

The movement rotation information generation apparatus 1 may move a jaw image in a desire direction to a desired position and display the jaw image by calculating movement rotation information indicative of a movement amount and a rotation amount of a moving plane formed from three moving points when the moving plane is made coincide with a reference plane formed from three reference points.

Further, the movement rotation information generation apparatus 1 may generate reference position image data indicative of a reference position image obtained by moving and/or rotating a jaw image based on movement rotation information. The reference position image corresponding to reference position image data generated by the movement rotation information generation apparatus 1 may be applied to various application programs such as a virtual articulator.

Figure 14:
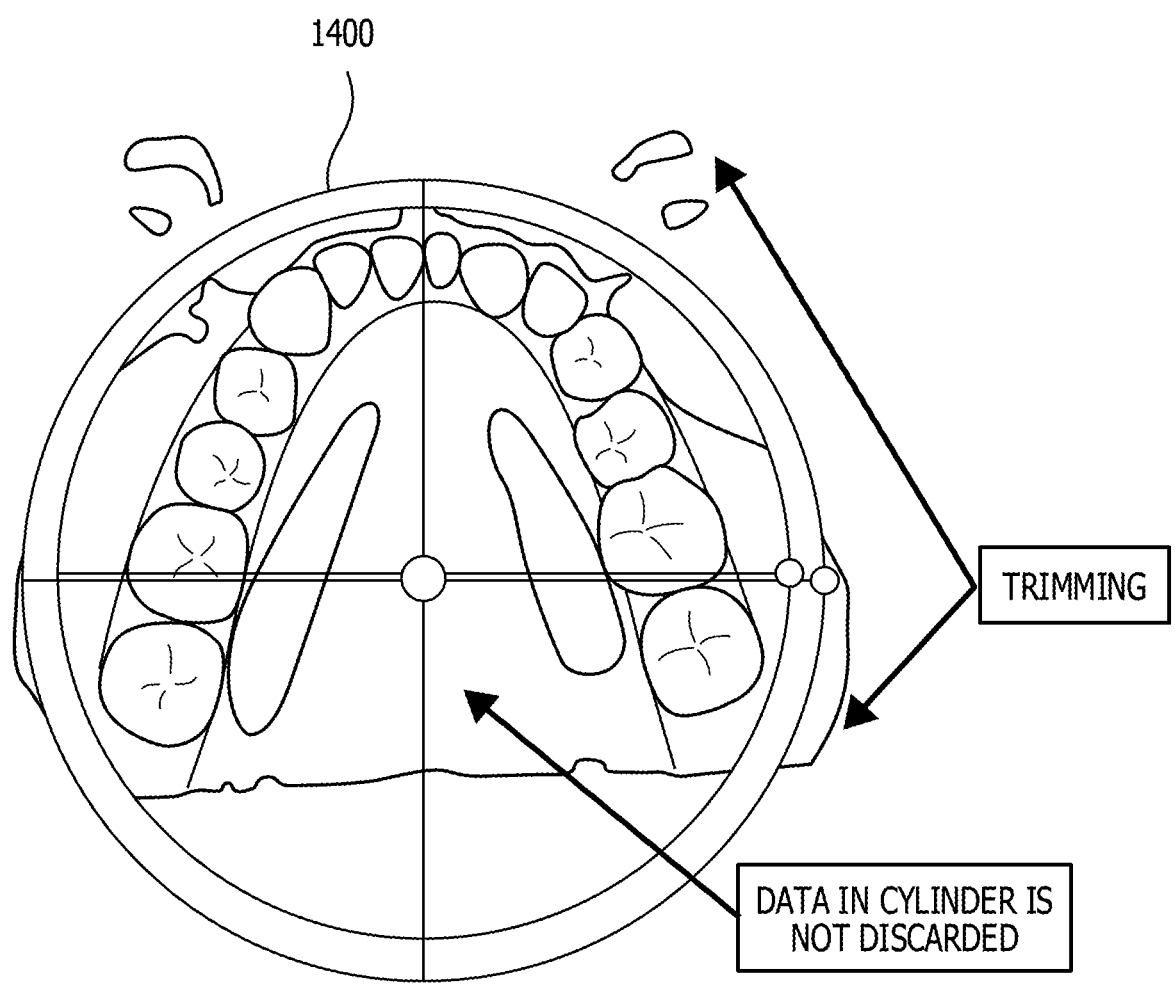
FIG. 14 is a view depicting an example of a scan range designated by the scanner apparatus.

Further, a scan range scanned by a dental 3D scanner may be defined using a reference position image corresponding to reference position image data generated by the movement rotation information generation apparatus 1. A scanner apparatus is available in which, in order to make small the size of scan data when a tooth type model is scanned by a model scanner, a scan range 1400 is designated as depicted in FIG. 14 in response to a result of scanning performed roughly at a first stage. If a reference position image corresponding to reference position image data generated by the movement rotation information generation apparatus 1 is used and the positions of front teeth and back teeth are estimated, the scan range may be designated automatically such that it includes the front teeth and the back teeth.

Further, the movement rotation information generation apparatus 1 may make the directions of tooth type images corresponding to the tooth type scan data stored in an electronic archive in an orthodontic clinic or the like if it is applied to tooth type scan data stored in the electronic archive. If the movement rotation information generation apparatus 1 is applied to tooth type scan data stored in the electronic archive, by making the directions of tooth type images stored in the electronic archive coincide with each other, it becomes easy to sort the tooth type scan data and becomes easy to view a tooth type image.

Further, by clustering point groups included in jaw scan data and associated with types of teeth in response to the types of teeth, the movement rotation information generation apparatus 1 may sort out the point groups that form images including left and right teeth of same numbers having symmetrical shapes to each other. At this time, the movement rotation information generation apparatus 1 clusters the point groups in response to the distance between points associated with some type of teeth. In one example, the movement rotation information generation apparatus 1 sorts out feature points into left and right clusters based on a threshold value distance that is greater than the width of a tooth crown of a tooth but is smaller than the distance between left and right teeth to which the same number is applied.

(Modification to Movement Rotation Information Generation Apparatus According to Embodiment)

The movement rotation information generation apparatus 1 decides, in response to a selection instruction of the user, whether the jaw scan data is lower jaw scan data or upper jaw scan data. However, the movement rotation information generation apparatus 1 according to the embodiment may decide, otherwise based on the acquired jaw scan data, whether the jaw scan data is lower jaw scan data or upper jaw scan data. For example, the movement rotation information generation apparatus 1 may decide, from the acquired jaw scan data, based on whether or not the third teeth have a tooth crown shape corresponding to a so-called oblique tooth, whether the jaw scan data is lower jaw scan data or upper jaw scan data.

Further, although the movement rotation information generation apparatus 1 executes a movement rotation information generation process using the left and right lower jaw first teeth, left lower jaw sixth tooth and right lower jaw sixth tooth, the movement rotation information generation apparatus according to the embodiment may execute a movement rotation information generation process using some other teeth. For example, the movement rotation information generation apparatus according to the embodiment may execute a movement rotation information generation process using the left lower jaw seventh tooth and the right lower jaw seventh tooth in place of the left lower jaw sixth tooth and the right lower jaw sixth tooth. Alternatively, the movement rotation information generation apparatus of the present embodiment may execute a movement rotation information generation process using the left lower jaw seventh tooth and the right lower jaw seventh tooth in addition to the left and right lower jaw first teeth, left lower jaw sixth tooth and right lower jaw sixth tooth.

FIG. 15 is a view illustrating an example in which left and right lower jaw first teeth, lower jaw sixth teeth and lower jaw seventh teeth are used when a movement rotation information generation process is executed.

The movement rotation information generation apparatus according to the embodiment determines the coordinates of the center of gravity of the left and right lower jaw first teeth to the coordinates of the first moving point; determines the coordinates of the center of gravity of the left lower jaw sixth tooth and lower jaw seventh tooth to the coordinates of the second moving point; and determines the coordinates of the center of gravity of the right lower jaw sixth tooth and lower jaw seventh tooth to the coordinates of the third moving point. Since the movement rotation information generation apparatus according to the embodiment executes a movement rotation information generation process using two types of teeth including the lower jaw sixth teeth and the lower jaw seventh teeth, the number of feature points to be used increases, and consequently, the processing accuracy of the movement rotation information generation process is improved.

Further, the movement rotation information generation apparatus according to the embodiment may determine the coordinates of the reference plane to arbitrary coordinates.

Figure 16B:
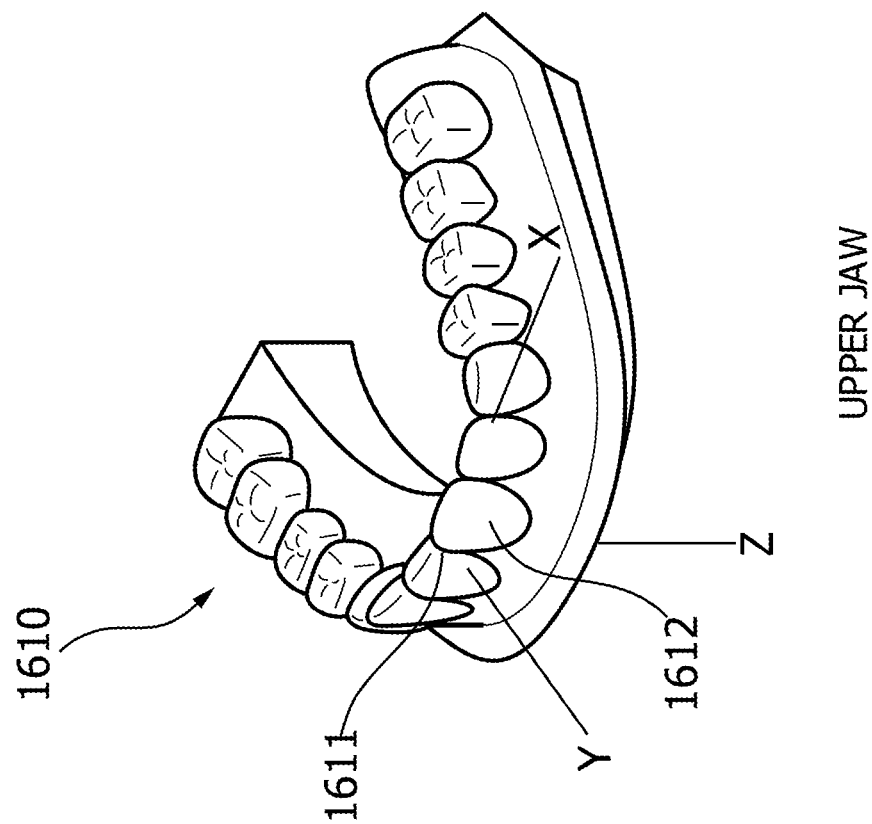
FIG. 16B depicts an example of coordinate axes of an upper jaw reference plane.
Figure 16A:
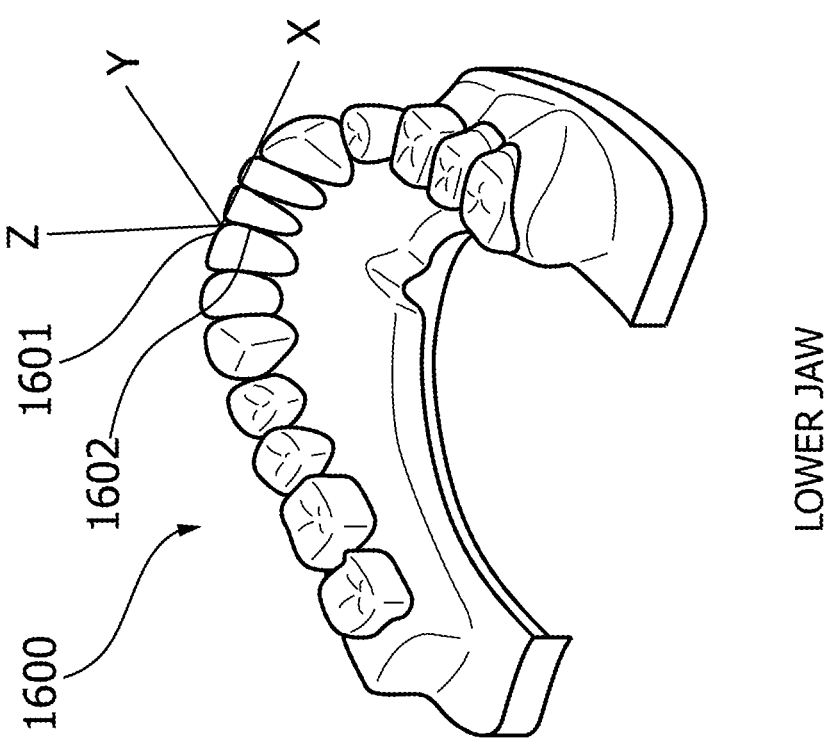
FIG. 16A is a view depicting an example of coordinate axes of a lower jaw reference plane.

FIG. 16A is a view depicting an example of coordinate axes of a lower jaw reference plane, and FIG. 16B depicts an example of coordinate axes of an upper jaw reference plane.

The coordinate axes of the lower jaw reference plane may have the origin at the coordinates of the center of gravity of tooth crowns of a left lower jaw first tooth 1601 and right lower jaw first tooth 1602 of a lower jaw image 1600. Further, among the coordinate axes of the lower jaw reference plane, the X axis may extend in the rightward direction of the lower jaw image 1600; the Y axis may extend in the forward direction of the lower jaw image 1600; and the Z axis may extend in the upward direction of the lower jaw image 1600. Meanwhile, the coordinate axes of the upper jaw reference plane may have the origin at the coordinates of the center of gravity of tooth crowns of an upper jaw first tooth 1611 and another upper jaw first tooth 1612 of an upper jaw image 1610. Further, among the coordinate axes of the upper jaw reference plane, the X axis may extend in the leftward direction of the upper jaw image 1610 whose X axis is reversed; the Y axis may extend in the forward direction of the upper jaw image 1610; and the Z axis may extend in the downward direction of the upper jaw image 1610. Further, the movement rotation information generation apparatus according to the embodiment may define the upper jaw reference plane and the coordinate axes of the lower jaw such that they coincide with the upper jaw reference plane and the coordinate axes of the lower jaw, respectively. In the movement rotation information generation apparatus according to the embodiment, by making the upper jaw reference plane and the coordinate axes of the lower jaw coincide with each other, it is facilitated to perform initial positioning when an occlusion state of the upper jaw and the lower jaw is to be determined. Further, in the movement rotation information generation apparatus according to the embodiment, by making the upper jaw reference plane and the coordinate axes of the lower jaw coincide with each other, application of a virtual articulator or the like to various application programs is facilitated.

(Configuration and Function of Occlusion State Specification Apparatus According to Embodiment)

Figure 17:
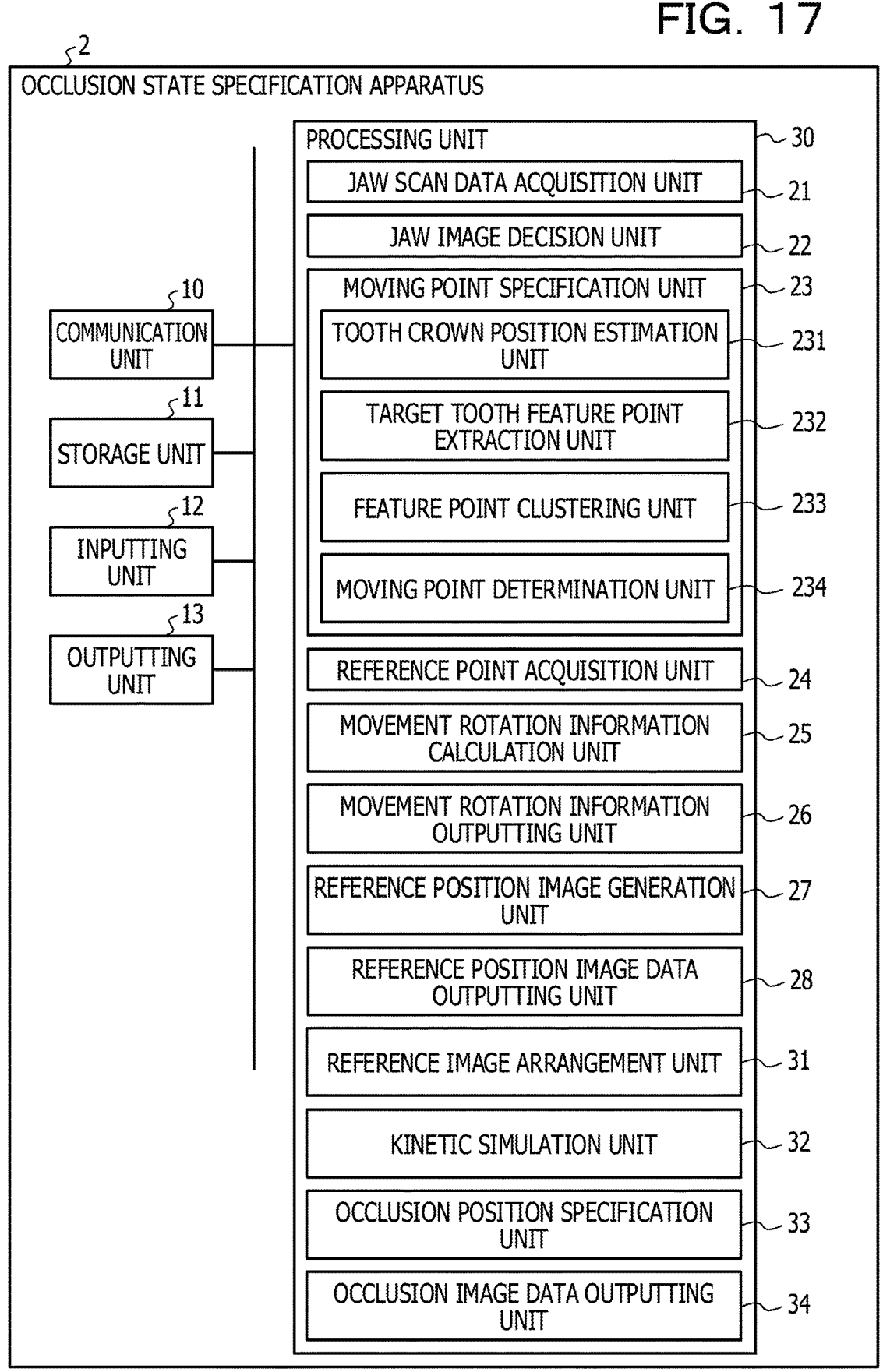
FIG. 17 is a block diagram of an occlusion state specification apparatus according to an embodiment.

FIG. 17 is a block diagram of an occlusion state specification apparatus according to an embodiment.

The occlusion state specification apparatus 2 is different from the movement rotation information generation apparatus 1 in that it includes a processing unit 30 in place of the processing unit 20. The processing unit 30 is different from the processing unit 20 in that it includes a reference image arrangement unit 31, a kinetic simulation unit 32, an occlusion position specification unit 33 and an occlusion image data outputting unit 34. The configuration and the function of the components of the occlusion state specification apparatus 2 other than the components from the reference image arrangement unit 31 to the occlusion image data outputting unit 34 are similar to those of the components of the occlusion state specification apparatus 2 to which same reference characters are applied, and therefore, detailed description of them is omitted here.

(Action of Occlusion State Specification Apparatus According to Embodiment)

FIG. 18 is a flow chart of an occlusion state specification process by an occlusion state specification apparatus. The occlusion state specification apparatus may be the occlusion state specification apparatus 2 depicted in FIG. 17. The occlusion state specification process depicted in FIG. 18 is executed principally by the processing unit 30 in cooperation with the respective components of the occlusion state specification apparatus 2 based on a program stored in advance in the storage unit 11.

First, the jaw scan data acquisition unit 21 acquires upper jaw scan data corresponding to an upper jaw image including the upper jaw (S401). Then, the jaw image decision unit 22 decides that the upper jaw scan data acquired in response to a selection instruction of the user is upper jaw scan data corresponding to an upper jaw image including the upper jaw (S402). Then, the jaw scan data acquisition unit 21 acquires lower jaw scan data corresponding to a lower jaw image including the lower jaw (S403). Then, the jaw image decision unit 22 decides in response to a selection instruction of the user that the acquired lower jaw scan data is lower jaw scan data corresponding to a lower jaw image including the lower jaw (S404).

Then, the moving point specification unit 23, the reference point acquisition unit 24 and the movement rotation information calculation unit 25 calculate upper jaw movement rotation information indicative of a movement amount and a rotation amount of a moving plane when an upper jaw moving plane of an upper jaw image corresponding to the acquired upper jaw scan data is made coincide with an upper jaw reference plane (S405). Then, the moving point specification unit 23, the reference point acquisition unit 24 and the movement rotation information calculation unit 25 calculate lower jaw movement rotation information indicative of a movement amount and a rotation amount of a moving plane when a moving plane of a lower jaw image corresponding to the acquired lower jaw scan data is made coincide with a lower jaw reference plane (S406). The processes at S405 and S406 are similar to those at S103 to S105, and therefore, detailed description of them is omitted here.

Then, the reference image arrangement unit 31 moves and rotates the upper jaw image to arrange the upper jaw image at a given upper jaw reference position based on the upper jaw movement rotation information calculated by the process at S405 such that the upper jaw moving plane of the upper jaw image coincides with the upper jaw reference plane (S407). Then, the reference image arrangement unit 31 moves and rotates the lower jaw image to arrange the lower jaw image at a given lower jaw reference position based on the lower jaw movement rotation information calculated by the process at S406 such that the lower jaw moving plane of the lower jaw image coincides with the lower jaw reference plane (S408).

Since the upper jaw moving plane of the upper jaw image coincides with the upper jaw reference plane and the lower jaw moving plane of the lower jaw image coincides with the lower jaw reference plane, the upper jaw included in the upper jaw image and the lower jaw included in the lower jaw image are arranged in a spaced relationship from each other such that the corresponding teeth are opposed to each other. In one example, the X coordinate and the Y coordinate of the coordinates of the center of gravity of the left and right upper jaw first teeth included in the upper jaw image and the X coordinate and the Y coordinate of the coordinates of the center of gravity of the left and right lower jaw first teeth included in the lower jaw image coincide with each other. Further, the X coordinate and the Y coordinate of the coordinates of the center of gravity of the left upper jaw sixth tooth included in the upper jaw image and the X coordinate and the Y coordinate of the coordinates of the center of gravity of the left lower jaw sixth tooth included in the lower jaw image coincide with each other. Furthermore, the X coordinate and the Y coordinate of the coordinates of the center of gravity of the right upper jaw sixth tooth included in the upper jaw image and the X coordinate and the Y coordinate of the coordinates of the center of gravity of the right lower jaw sixth tooth included in the lower jaw image coincide with each other.

Then, the kinetic simulation unit 32 executes a process for moving the upper jaw included in the upper jaw image by execution of a kinetic simulation (S409). Since the kinetic simulation unit 32 executes the kinetic simulation, the upper jaw moves with respect to the lower jaw that is in a fixed state until the upper jaw is brought into contact with and stopped by the lower jaw. The kinetic simulation is a simulation of calculating an object motion in accordance with a law of physics, and not directly moves an image indicative of an object to move the object but applies force such as the gravity or tension to an object to indirectly move the object to calculate a motion of the object. In one example, the kinetic simulation unit 32 executes a kinetic simulation for allowing the upper jaw included in an upper jaw image to naturally fall by the gravity. The kinetic simulation unit 32 defines the upper jaw included in the upper jaw image as an object whose mass per unit surface area is uniform and allows the upper jaw included in the upper jaw image to naturally fall by the gravity. For example, the kinetic simulation unit 32 defines each piece of the jaw scan data indicating the upper jaw image and the lower jaw image as a rigid body that is as thin as possible with a uniform thickness and is uniform in mass per unit surface area similarly to shell data of a shell element or the like of a finite element method. Further, the kinetic simulation unit 32 defines both the upper jaw included in the upper jaw image and the lower jaw included in the lower jaw image as rigid bodies whose shape is not deformed.

Further, the kinetic simulation unit 32 executes a kinetic simulation in a state in which it does not take the friction between the teeth of the upper jaw included in the upper jaw image and the teeth of the lower jaw included in the lower jaw image into consideration. For example, the kinetic simulation unit 32 executes a kinetic simulation setting the frictional force between the teeth of the upper jaw and the teeth of the lower jaw to zero by setting the frictional coefficient between the teeth of the upper jaw included in the upper jaw image and the teeth of the lower jaw included in the lower jaw image to zero or the like.

Then, the occlusion position specification unit 33 specifies the positional relationship between the upper jaw image and the lower jaw image after the moving process as a positional relationship corresponding to the occlusion state of the teeth included in the upper jaw image and the teeth included in the lower jaw image (S410). The occlusion position specification unit 33 generates occlusion image data indicative of an occlusion image including the upper jaw image and the lower jaw image when the positional relationship corresponding to the occlusion state is specified and stores the generated occlusion image data into the storage unit 11.

Then, the occlusion image data outputting unit 34 outputs the occlusion image data generated by the process at S410 (S411).

(Operation/Working Effect of Occlusion State Specification Apparatus According to Embodiment)

The occlusion state specification apparatus 2 moves at least one of the upper jaw and the lower jaw included in an upper jaw image and a lower jaw image arranged such that corresponding teeth are opposed to each other by execution of a kinetic simulation to generate an occlusion image. By moving at least one of the upper jaw and the lower jaw to generate an occlusion image by execution of a kinetic simulation, the occlusion state specification apparatus 2 may generate an occlusion image without utilizing scan data indicative of the occlusion state.

Further, since the occlusion state specification apparatus 2 executes a kinetic simulation in a state in which the friction between the teeth of the upper jaw included in an upper jaw image and the teeth of the lower jaw included in a lower jaw image is not taken into consideration, it may specify the positional relationship according to the shape of tooth crowns of the teeth of the upper jaw and the teeth of the lower jaw as an occlusion state.

(Modification to Occlusion State Specification Apparatus According to Embodiment)

Although the occlusion state specification apparatus 2 is configured such that the upper jaw included in an upper jaw image is allowed to naturally drop by the gravity to cause the teeth of the upper jaw included in the upper jaw image and the teeth of the lower jaw included in a lower jaw image to engage with each other, the occlusion state specification apparatus according to the embodiment may allow one of the upper jaw and the lower jaw to move in accordance with a law of physics. For example, the occlusion state specification apparatus according to the embodiment may be configured such that the arrangement relationship of the upper jaw image and the lower jaw image is vertically reversed to allow the lower jaw included in the lower jaw image to naturally drop by the gravity thereby to allow the teeth of the upper jaw included in the upper jaw image and the teeth of the lower jaw included in the lower jaw image to engage with each other. At this time, the lower jaw moves with respect to the upper jaw that is in a fixed state until the lower jaw is brought into contact with and stopped by the upper jaw. Alternatively, the occlusion state specification apparatus according to the embodiment may be configured such that force is applied to both the upper jaw and the lower jaw in a direction in which upper jaw and the lower jaw are engaged with each other and both the upper jaw and the lower jaw are moved such that the teeth of the upper jaw included in the upper jaw image and the teeth of the lower jaw included in the lower jaw image are engaged with each other.

Further, although the occlusion state specification apparatus 2 is configured such that the frictional force between the teeth of the upper jaw and the teeth of the lower jaw is set to zero to specify the arrangement relationship of them, the occlusion state specification apparatus according to the embodiment may specify the arrangement relationship by setting the frictional force between the teeth of the upper jaw and the teeth of the lower jaw to substantially zero.

Further, the occlusion state specification apparatus 2 outputs occlusion image data indicative of an occlusion image including an upper jaw image and a lower jaw image. However, the occlusion state specification apparatus according to the embodiment may otherwise output movement rotation information indicative of a movement amount and/or a rotation amount of the lower jaw and/or the upper jaw moved by execution of a kinetic simulation in addition to the occlusion image data. In this case, the occlusion state specification apparatus according to the embodiment includes a movement rotation information outputting unit that outputs movement rotation information indicative of a movement amount and/or a rotation amount of the lower jaw and/or the upper jaw moved by execution of a kinetic simulation in addition to the occlusion image data. The movement rotation information outputted from the occlusion state specification apparatus according to the embodiment may include a matrix indicative of a movement amount and/or a rotation amount of the lower jaw and/or the upper jaw moved by execution of a kinetic simulation.

Further, although the occlusion state specification apparatus 2 executes processing using an image corresponding to scan data generated by a 3D scanner apparatus, the occlusion state specification apparatus according to the embodiment may execute processing using an image corresponding to data other than scan data.

All examples and conditional language recited herein are intended for pedagogical purposes to and the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium for storing a program that causes a processor to execute a process for generating movement rotation information, the process comprising:

acquiring a first jaw image and a second jaw image, the first jaw image including an upper jaw, the second jaw image including a lower jaw;

executing first processing that includes specifying first position information indicative of positions of three or more first points individually corresponding to three or more types of teeth included in the first jaw image, each of the three or more types of teeth included in the first jaw image being different in type of teeth from each other, the three or more first points including a first moving point, a second moving point, and a third moving point, the first moving point being coordinates corresponding to a center of gravity of a first teeth group, the second moving point being coordinates corresponding to a center of gravity of a second teeth group, the third moving point being coordinates corresponding to a center of gravity of a third teeth group, the first teeth group including a teeth of a first type among the three or more types of teeth and a teeth adjacent to the teeth of the first type, the second teeth group including a teeth of a second type among the three or more types of teeth and a teeth adjacent to the teeth of the second type, the third teeth group including a teeth of a third type among the three or more types of teeth and a teeth adjacent to the teeth of the third type, and specifying second position information indicative of positions of three or more second points individually corresponding to three or more types of teeth included in the second jaw image, each of the three or more types of teeth included in the second jaw image being different in type of teeth from each other, the three or more second points including a fourth moving point, a fifth moving point and a sixth moving point, the fourth moving point being coordinates corresponding to a center of gravity of a fourth teeth group, the fifth moving point being coordinates corresponding to a center of gravity of a fifth teeth group, the sixth moving point being coordinates corresponding to a center of gravity of a sixth teeth group, the fourth teeth group including a teeth of a fourth type among the three or more types of teeth and a teeth adjacent to the teeth of the fourth type, the fifth teeth group including a teeth of a fifth type among the three or more types of teeth and a teeth adjacent to the teeth of the fifth type, the sixth group including a teeth of a sixth type among the three or more types of teeth and a teeth adjacent to the teeth of the sixth type;

executing second processing that includes
  acquiring first reference points corresponding to the tree or more types of teeth in the upper jaw, the first reference points including at least three reference points each of which corresponds to any of the three or more types of teeth in the upper jaw, a position of each of the first reference points being determined by first positional relationship information that indicates, for each of the three or more types of teeth in the upper jaw, a position corresponding to any of the first reference points, and
  acquiring second reference points corresponding to the three or more types of teeth in the lower jaw, the second reference points including at least three reference points each of which corresponds to any of the three or more types of teeth in the lower jaw, a position of each of the second reference points being determined by second positional relationship information that indicates, for each of the three or more types of teeth in the lower jaw, a position corresponding to any of the second reference points;

executing third processing that includes
  calculating first movement rotation information so that a first plane is made coincide with a first reference plane, the first plane being a plane that includes the first moving point and the second moving point and the third moving point, the first reference plane being a plane that includes the first reference points, the first movement rotation information including at least either of a movement amount and a rotation amount with respect to the first plane, and
  calculating second movement rotation information so that a second plane is made coincide with a second reference plane, the second plane being a plane that includes the fourth moving point and the fifth moving point and the sixth moving point, the second reference plane being a plane that includes the second reference points, the second movement rotation information including at least either of a movement and a rotation amount with respect to the second plane; and outputting the first movement rotation information and the second movement rotation information.

2. The non-transitory computer-readable storage medium according to claim 1,
  wherein each of the first jaw image and the second jaw image is an image generated by scanning with a three-dimensional scanner.

3. The non-transitory computer-readable storage medium according to claim 2,
  wherein the process further includes:
    executing fifth processing that includes
      generating first reference position image data indicating a first reference position image in which the first jaw image is arranged in a state moved, or rotated, or moved and rotated, based on the first movement rotation information, and
      generating second reference position image data indicating a second reference position image in which the second jaw image is arranged in a state moved, or rotated, or moved and rotated, based on the first movement rotation information; and
    executing sixth processing that includes
      outputting the first reference position image data, and
      outputting the second reference position image data.

4. The non-transitory computer-readable storage medium according to claim 1,
  wherein the first processing is configured to
    perform clustering on first point groups in accordance with the three or more types of teeth in the first jaw image, each of the first point groups being included in the acquired first jaw image and being associated with any of the three or more types of teeth in the first jaw image,
    perform clustering on second point groups in accordance with the three or more types of teeth in the second jaw image, each of the second point groups being included in the acquired second jaw image and being associated with any of the three or more types of teeth in the second jaw image.

5. The non-transitory computer-readable storage medium according to claim 4,
  wherein the process of clustering is configured to
    perform clustering on the first point groups in accordance with a distance from a point associated with any of the three or more types of teeth in the first jaw image, and
    perform clustering on the second point groups in accordance with a distance from a point associated with any of the three or more types of teeth in the second jaw image.

6. The non-transitory computer-readable storage medium according to claim 1,
  wherein the movement rotation information includes a matrix indicative of a movement amount, or a rotation amount, or both the movement amount and the rotation amount, of the plane when the plane is to be made coincide with the reference plane.

7. An apparatus for generating movement rotation information, the apparatus comprising:
  a memory configured to store positional relationship information that associates types of teeth with second position information indicating positions of reference points; and
  a processor coupled to the memory and configured to execute a first acquisition process that includes acquiring a first jaw image and a second jaw image, the first jaw image including an upper jaw, the second jaw image including a lower jaw;

execute a specification process that includes
specifying first position information indicative of positions of three or more first points individually corresponding to three or more types of teeth included in the first jaw image, each of the three or more types of teeth included in the first jaw image being different in type of teeth from each other, the three or more first points including a first moving point, a second moving point, and a third moving point, the first moving point being coordinates corresponding to a center of gravity of a first teeth group, the second moving point being coordinates corresponding to a center of gravity of a second teeth group, the third moving point being coordinates corresponding to a center of gravity of a third teeth group, the first teeth group including a teeth of a first type among the three or more types of teeth and a teeth adjacent to the teeth of the first type, the second teeth group including a teeth of a second type among the three or more types of teeth and a teeth adjacent to the teeth of the second type, the third teeth group including a teeth of a third type among the three or more types of teeth and a teeth adjacent to the teeth of the third type, and
specifying second position information indicative of positions of three or more second points individually corresponding to three or more types of teeth included in the second jaw image, each of the three or more types of teeth included in the second jaw image being different in type of teeth from each other, the three or more second points including a fourth moving point, a fifth moving point and a sixth moving point, the fourth moving point being coordinates corresponding to a center of gravity of a fourth teeth group, the fifth moving point being coordinates corresponding to a center of gravity of a fifth teeth group, the sixth moving point being coordinates corresponding to a center of gravity of a sixth teeth group, the fourth teeth group including a teeth of a fourth type among the three or more types of teeth and a teeth adjacent to the teeth of the fourth type, the fifth teeth group including a teeth of a fifth type among the three or more types of teeth and a teeth adjacent to the teeth of the fifth type, the sixth group including a teeth of a sixth type among the three or more types of teeth and a teeth adjacent to the teeth of the sixth type;
execute a second acquisition process that includes
acquiring first reference points corresponding to the tree or more types of teeth in the upper jaw, the first reference points including at least three reference points each of which corresponds to any of the three or more types of teeth in the upper jaw, a position of each of the first reference points being determined by first positional relationship information that indicates, for each of the three or more types of teeth in the upper jaw, a position corresponding to any of the first reference points, and
acquiring second reference points corresponding to the three or more types of teeth in the lower jaw, the second reference points including at least three reference points each of which corresponds to any of the three or more types of teeth in the lower jaw, a position of each of the second reference points being determined by second positional relationship information that indicates, for each of the three or more types of teeth in the lower jaw, a position corresponding to any of the second reference points;

execute a calculation process that includes
calculating first movement rotation information so that a first plane is made coincide with a first reference plane, the first plane being a plane that includes the first moving point and the second moving point and the third moving point, the first reference plane being a plane that includes the first reference points, the first movement rotation information including at least either of a movement amount and a rotation amount with respect to the first plane, and
calculating second movement rotation information so that a second plane is made coincide with a second reference plane, the second plane being a plane that includes the fourth moving point and the fifth moving point and the sixth moving point, the second reference plane being a plane that includes the second reference points, the second movement rotation information including at least either of a movement amount and a rotation amount with respect to the second plane; and
execute an outputting process that includes outputting the first movement rotation information and the second movement rotation information.

8. A method performed by a computer for generating movement rotation information, the method comprising:
acquiring, by a processor of the computer, a first jaw image and a second jaw image, the first jaw image including an upper jaw, the second jaw image including a lower jaw;
executing first processing that includes
specifying, by the processor of the computer, first position information indicative of positions of three or more first points individually corresponding to three or more types of teeth included in the first jaw image, each of the three or more types of teeth included in the first jaw image being different in type of teeth from each other, the three or more first points including a first moving point, a second moving point, and a third moving point, the first moving point being coordinates corresponding to a center of gravity of a first teeth group, the second moving point being coordinates corresponding to a center of gravity of a second teeth group, the third moving point being coordinates corresponding to a center of gravity of a third teeth group, the first teeth group including a teeth of a first type among the three or more types of teeth and a teeth adjacent to the teeth of the first type, the second teeth group including a teeth of a second type among the three or more types of teeth and a teeth adjacent to the teeth of the second type, the third teeth group including a teeth of a third type among the three or more types of teeth and a teeth adjacent to the teeth of the third type, and
specifying second position information indicative of positions of three or more second points individually corresponding to three or more types of teeth included in the second jaw image, each of the three or more types of teeth included in the second jaw image being different in type of teeth from each other, the three or more second points including a fourth moving point, a fifth moving point and a sixth moving point, the fourth moving point being coordinates corresponding to a center of gravity of a fourth teeth group, the fifth moving point being coordinates corresponding to a center of gravity of a fifth teeth group, the sixth moving point being coordinates corresponding to a center of gravity of a sixth teeth group, the fourth teeth group including a teeth of a fourth type among the three or more types of teeth and a teeth adjacent to the teeth of the fourth type, the fifth teeth group including a teeth of a fifth type among the three or more types of teeth and a teeth adjacent to the teeth of the fifth type, the sixth group including a teeth of a sixth type among the three or more types of teeth and a teeth adjacent to the teeth of the sixth type;

executing second processing that includes
- acquiring first reference points corresponding to the tree or more types of teeth in the upper jaw, the first reference points including at least three reference points each of which corresponds to any of the three or more types of teeth in the upper jaw, a position of each of the first reference points being determined by first positional relationship information that indicates, for each of the three or more types of teeth in the upper jaw, a position corresponding to any of the first reference points, and
- acquiring second reference points corresponding to the three or more types of teeth in the lower jaw, the second reference points including at least three reference points each of which corresponds to any of the three or more types of teeth in the lower jaw, a position of each of the second reference points being determined by second positional relationship information that indicates, for each of the three or more types of teeth in the lower jaw, a position corresponding to any of the second reference points;

executing third processing that includes
- calculating first movement rotation information so that a first plane is made coincide with a first reference plane, the first plane being a plane that includes the first moving point and the second moving point and the third moving point, the first reference plane being a plane that includes the first reference points, the first movement rotation information including at least either of a movement amount and a rotation amount with respect to the first plane, and
- calculating second movement rotation information so that a second plane is made coincide with a second reference plane, the second plane being a plane that includes the fourth moving point and the fifth moving point and the sixth moving point, the second reference plane being a plane that includes the second reference points, the second movement rotation information including at least either of a movement amount and a rotation amount with respect to the second plane; and outputting, by the processor of the computer, the first movement rotation information and the second movement rotation information.

* * * * *